US012552846B2

(12) United States Patent
Kappel et al.

(10) Patent No.: US 12,552,846 B2
(45) Date of Patent: Feb. 17, 2026

(54) MODIFIED BCL9 MIMETIC PEPTIDES

(71) Applicant: Sapience Therapeutics, Inc., Harrison, NY (US)

(72) Inventors: Barry Jay Kappel, Pelham, NY (US); Gene Merutka, Phoenixville, PA (US); Jimmy Andrew Rotolo, Port Washington, NY (US); Erin E. Gallagher, Bronx, NY (US)

(73) Assignee: Sapience Therapeutics, Inc., Tarrytown, NY (US)

( * ) Notice: Subject to any disclaimer, the term of this patent is extended or adjusted under 35 U.S.C. 154(b) by 907 days.

(21) Appl. No.: 17/624,672

(22) PCT Filed: Jul. 6, 2020

(86) PCT No.: PCT/US2020/040889
§ 371 (c)(1),
(2) Date: Jan. 4, 2022

(87) PCT Pub. No.: WO2021/007158
PCT Pub. Date: Jan. 14, 2021

(65) Prior Publication Data
US 2022/0275036 A1    Sep. 1, 2022

Related U.S. Application Data

(60) Provisional application No. 62/870,938, filed on Jul. 5, 2019.

(51) Int. Cl.
*C07K 14/47*     (2006.01)
*A61P 35/04*     (2006.01)
*C07K 14/82*     (2006.01)

(52) U.S. Cl.
CPC .......... *C07K 14/4705* (2013.01); *A61P 35/04* (2018.01); *C07K 14/82* (2013.01)

(58) Field of Classification Search
CPC ...... C07K 14/4705; C07K 14/82; A61P 35/04
See application file for complete search history.

(56) References Cited

U.S. PATENT DOCUMENTS

2014/0005118 A1    1/2014  Verdine et al.
2014/0113857 A1    4/2014  Walensky et al.

FOREIGN PATENT DOCUMENTS

WO    WO 2017/062518       4/2017
WO    WO-2021041895 A1 *   3/2021    ........... A61K 47/645

OTHER PUBLICATIONS

Drumm et al, Genetic Variation and Clinical Heterogeneity in Cystic Fibrosis, Annu. Rev. Pathol. Mech. Dis., 2012, 7, pp. 267-282.*
Yampolsky et al, The Exchangeability of Amino Acids in Proteins, Genetics, 2005, 170, pp. 1459-1472.*
Adessi et al, Converting a Peptide into a Drug: Strategies to Improve Stability and Bioavailability, Current Medicinal Chemistry, 2002, 9, pp. 963-978.*
Bastings, J. et al., D-amino Acids in Health and Disease: A Focus on Cancer, Nutrients 11:2205; doi. 10.3390/nu11092205; 2019.
Kawamoto, S. et al., Design of Triazole-stapled BCL9 alpha-Helical Peptides to Target the beta-Catenin/B-cell CLL/lymphoma 9 (BCL9) . . . , J. Med. Chem. 55:1137-1146; 2012.
Zhang, M. et al. Structure-Based Optimization of Small-Molecule Inhibitors for the beta-Catenin/B-Cell Lymphoma 9 Protein-Protein Interaction, J. Med. Chem. 61:2989-3007; 2018.
Arranz-Gibert P et al., Immunosilencing peptides by stereochemical inversion and sequence reversal: retro-D-peptides; Sci. Rep. 8:6446; 2018.
Feng M et al., Pharmacological inhibition of Beta-catenin/BCL9 interaction overcomes resistance to immune checkpoint blockades by modulating . . . ; Sci. Adv. 5:eaau5240; 2019.
Kawamoto SA et al., Analysis of the Interaction of BCL9 with Beta-Catenin and Development of Fluorescence Polarization and Surface Plasmon . . . ; Biochem. 48:9534-9541; 2009.
Kawamoto SA, Targeting the BCL9/B9L Binding Interaction with Beta-catenin as a Potential Anticancer Strategy; Ph.D. Dissertation, University of Michigan; 2010.
Sampietro J et al., Crystal Structure of a Beta-Catenin/BCL9/Tcf4 Complex; Molec. Cell 24:293-300; 2006.
Takada K et al., Targeted Disruption of the BCL9/Beta-catenin Complex Inhibits Oncogenic Wnt Signaling; Sci. Transl. Med. 4:148ra117; 2012.
UniProtKB-15C4C5 (15C4C5_9BACT); 2012.
Zhan T et al., Wnt signaling in cancer; Oncogene 36:1461-1473; 2017.

* cited by examiner

*Primary Examiner* — Li N Komatsu
(74) *Attorney, Agent, or Firm* — Grimes & Yvon LLP

(57) ABSTRACT

Provided are BCL9 mimetic peptides having a modified a-helical homology domain-2 (HD2) region and, optionally, a cell-penetrating region, compositions comprising the BCL9 mimetic peptides, and methods of inhibiting proliferation of and/or promoting cytotoxicity in a neoplastic cell using the BCL9 mimetic peptides.

15 Claims, 6 Drawing Sheets

Specification includes a Sequence Listing.

MODIFIED BCL9 MIMETIC PEPTIDES

CROSS-REFERENCE TO RELATED APPLICATIONS

This application is the National Stage of International Application No. PCT/US2020/040889, filed on Jul. 6, 2020, and claims the benefit of priority of U.S. Provisional Patent Application No. 62/870,938, filed on Jul. 5, 2019.

This application claims the benefit of priority of U.S. Provisional Patent Application No. 62/870,938, filed on Jul. 5, 2019.

SEQUENCE LISTING

The instant application contains a Sequence Listing which has been submitted electronically in ASCII format and is hereby incorporated by reference in its entirety. Said ASCII copy, created on Jul. 6, 2020, is named Sapience_004_WO1_SL.txt and is 49,081 bytes in size.

BACKGROUND

B-cell CLL/lymphoma 9 (BCL9) is a protein that acts as a co-activator for β-catenin-mediated transcription. BCL9 is over-expressed in many tumors and enhances β-catenin signaling in cancer cells, but not in normal cells from which the tumors originate (Zhan et al. 2017). BCL9 interacts with β-catenin via its α-helical homology domain-2 (HD2). Previous studies have shown that disruption of the BCL9/β-catenin interaction using hydrocarbon-stapled BCL9 peptides suppresses transcription of Wnt target genes regulating proliferation, migration, invasion, and the metastatic potential of tumor cells (Takada et al., 2012; WO 2017/062518).

SUMMARY OF THE INVENTION

Some of the main aspects of the present invention are summarized below. Additional aspects are described in the Detailed Description of the Invention, Examples, Drawings, and Claims sections of this disclosure. The description in each section of this disclosure is intended to be read in conjunction with the other sections. Furthermore, the various embodiments described in each section of this disclosure can be combined in various different ways, and all such combinations are intended to fall within the scope of the present invention.

The invention provides BCL9 mimetic peptides comprising a modified BCL9 α-helical homology domain-2 (HD2) region. In one embodiment, the invention provides a BCL9 mimetic peptide comprising a modified BCL9 α-helical homology domain-2 (HD2) region, wherein the modified BCL9 HD2 region comprises a variant of the amino acid sequence LSQEQLEHRERSLQTLRDIQRMLF (SEQ ID NO: 1), wherein the variant is modified at one or more positions of SEQ ID NO: 1 as follows: (i) E7 is substituted with R; (ii) R11 is substituted with E; (iii) S12 is substituted with A; (iv) Q14 is substituted with A or E; (v) T15 is substituted with A; (vi) D18 is substituted with A or R; (vii) I19 is substituted with L; (viii) R21 is substituted with E; (ix) M22 is substituted with A or L; (x) W, 1-Nal, or 2-Nal is added at position 25. The BCL9 mimetic peptide can additionally comprise a modification wherein F24 is substituted with W, 1-Nal, or 2-Nal and/or wherein between 1 and 15 consecutive amino acids of SEQ ID NO: 1 are truncated beginning at L1. In one embodiment, the modified BCL9 HD2 region comprises an amino acid sequence selected from the group consisting of: LSQEQLEHRERSLATLRAIQRMLF (SEQ ID NO: 3); LSQEQLRHREESLETLRRIQEMLF (SEQ ID NO: 4); LSQEQLEHRERALQALRAIQRALF (SEQ ID NO: 5); and ALQALRAIQRALF (SEQ ID NO: 6). Also included are retro-inverso BCL9 mimetic peptides comprising D-amino acids in a reversed amino acid sequence relative to an amino acid sequence disclosed herein.

One embodiment of the invention is a BCL9 mimetic peptide comprising a modified BCL9 α-helical homology domain-2 (HD2) region, wherein the modified BCL9 HD2 region is a D-amino acid sequence comprising a variant of the D-amino acid sequence FLMRQIDRLTQLS (SEQ ID NO: 7), wherein the variant is modified at one or more positions of SEQ ID NO: 7 as follows: (i) F1 is substituted with L or W; (ii) M3 is substituted with A, E, L, or V; (iii) R4 is substituted with O (ornithine); (iv) I6 is substituted with L; (v) D7 is substituted with A or E; (vi) R8 is substituted with A; (vii) T10 is substituted with A, K, Q, or R; (viii) Q11 is substituted with A, K, or R; (ix) S13 is substituted with A. In a particular embodiment, the BCL9 mimetic peptide further comprises W, F, R, 1-Nal, or 2-Nal, in either D- or L-form, at the N-terminus of the peptide.

In certain embodiments, the modified BCL9 HD2 region comprises a D-amino acid sequence selected from the group consisting of: FLMRQIDRLTQLA (SEQ ID NO: 8); FLMRQLDRLTQLA (SEQ ID NO: 9); FLARQLARLAQLA (SEQ ID NO: 10); WLARQLARLAQLA (SEQ ID NO: 11); WWLARQLARLAQLA (SEQ ID NO: 12); FLMEQLRRLTELA (SEQ ID NO: 13); FLAEQLRRLAELA (SEQ ID NO: 14); WLAEQLRRLAELA (SEQ ID NO: 15); WWLARQLERLAQLA (SEQ ID NO: 16); 1-Nal-WLARQLARLRQLA (SEQ ID NO: 17); FLLRQIDRLTQLA (SEQ ID NO: 18); FLLRQLDRLTQLA (SEQ ID NO: 19); FLLRQLERLTQLA (SEQ ID NO: 20); WWLLRQLARLAQLA (SEQ ID NO: 102); 2-Nal-WLARQLARLAQLA (SEQ ID NO: 115); FWLARQLARLAQLA (SEQ ID NO: 116); WWLARQLARLRQLA (SEQ ID NO: 117); WFLARQLARLAQLA (SEQ ID NO: 118); WLLARQLARLAQLA (SEQ ID NO: 119); WWLERQLARLAQLA (SEQ ID NO: 120); WWLARQLARLQQLA (SEQ ID NO: 122); WWLARQLERLARLA (SEQ ID NO: 123); WWLARQLERLRRLA (SEQ ID NO: 124); WWLARQLARLKQLA (SEQ ID NO: 125); WWLARQLERLAKLA (SEQ ID NO: 126); WWLVRQLARLAQLA (SEQ ID NO: 127); and WWLAOQLAOLAQLA (SEQ ID NO: 140).

In certain embodiments, the BCL9 mimetic peptides of the invention comprise a modified BCL9 α-helical homology domain-2 (HD2) region of mixed chirality. In a particular embodiment, the modified BCL9 HD2 region comprises an amino acid sequence selected from the group consisting of: (i) $F_D R_L$[WLARQLARLAQLA]$_D$ (SEQ ID NO: 103); (ii) $F_D R_L$[WLVRQLARLAQLA]$_D$ (SEQ ID NO: 104); (iii) $F_D W_L$[WLVRQLARLAQLA]$_D$ (SEQ ID NO: 105); (iv) $F_D W_L$[WLARQLARLAALA]$_D$ (SEQ ID NO: 106); (v) $F_D W_L$[WLARQLAALAQLA]$_D$ (SEQ ID NO: 107); (vi) $W_L$-[WLARQLARLAQLA]$_D$ (SEQ ID NO: 108); (vii) $W_L$-[WLARQLARLRQLA]$_D$ (SEQ ID NO: 109); (viii) $W_L$-[WLARQLERLRRLA]$_D$ (SEQ ID NO: 110); (ix) $W_L$-[WLARQLERLARLA]$_D$ (SEQ ID NO: 111); (x) $F_L$-[WLARQLARLAQLA]$_D$ (SEQ ID NO: 112); (xi) $R_L$-[WLARQLARLAQLA]$_D$ (SEQ ID NO: 113); (xii) $F_D$-$W_L$-[WLARQLARLAQLA]$_D$ (SEQ ID NO: 114); and $W_L$-[WLVRQLARLAQLA]$_D$ (SEQ ID NO: 141); wherein D and L subscripts denote chirality of the amino acids.

In some embodiments, the BCL9 mimetic peptide comprises a cell-penetrating region, wherein the BCL9 mimetic peptide is a cell-penetrating peptide. In certain embodiments, the cell-penetrating region has an amino acid sequence selected from the group consisting of YGRKKRRQRRR (SEQ ID NO: 61) and VPTLK (SEQ ID NO: 32), or the cell-penetrating region has a D-amino acid sequence selected from the group consisting of RRRQRRKKRGY (SEQ ID NO: 73), KLTPV (SEQ ID NO: 74), PSDGRG (SEQ ID NO: 75), and OLTPV (SEQ ID NO: 143).

In some embodiments, the BCL9 mimetic peptide comprises an N-terminal group selected from the group consisting of acetyl, naphthyl, octanoyl, phenyl, and isovaleryl, and/or the BCL9 mimetic peptide comprises a C-terminal amide group.

In one aspect, BCL9 mimetic peptides of the invention are for use in inhibiting proliferation of and/or promoting cytotoxicity in a neoplastic cell.

Further aspects of the invention provide a composition comprising a BCL9 mimetic peptide of the invention, for example, a pharmaceutical composition; a kit comprising a BCL9 mimetic peptide of the invention; and a nucleic acid molecule encoding a BCL9 mimetic peptide of the invention.

The invention additionally provides methods of inhibiting proliferation of and/or promoting cytotoxicity in a neoplastic cell, the methods comprising contacting the neoplastic cell with a BCL9 mimetic peptide of the invention.

DETAILED DESCRIPTION OF THE INVENTION

Figure 1:
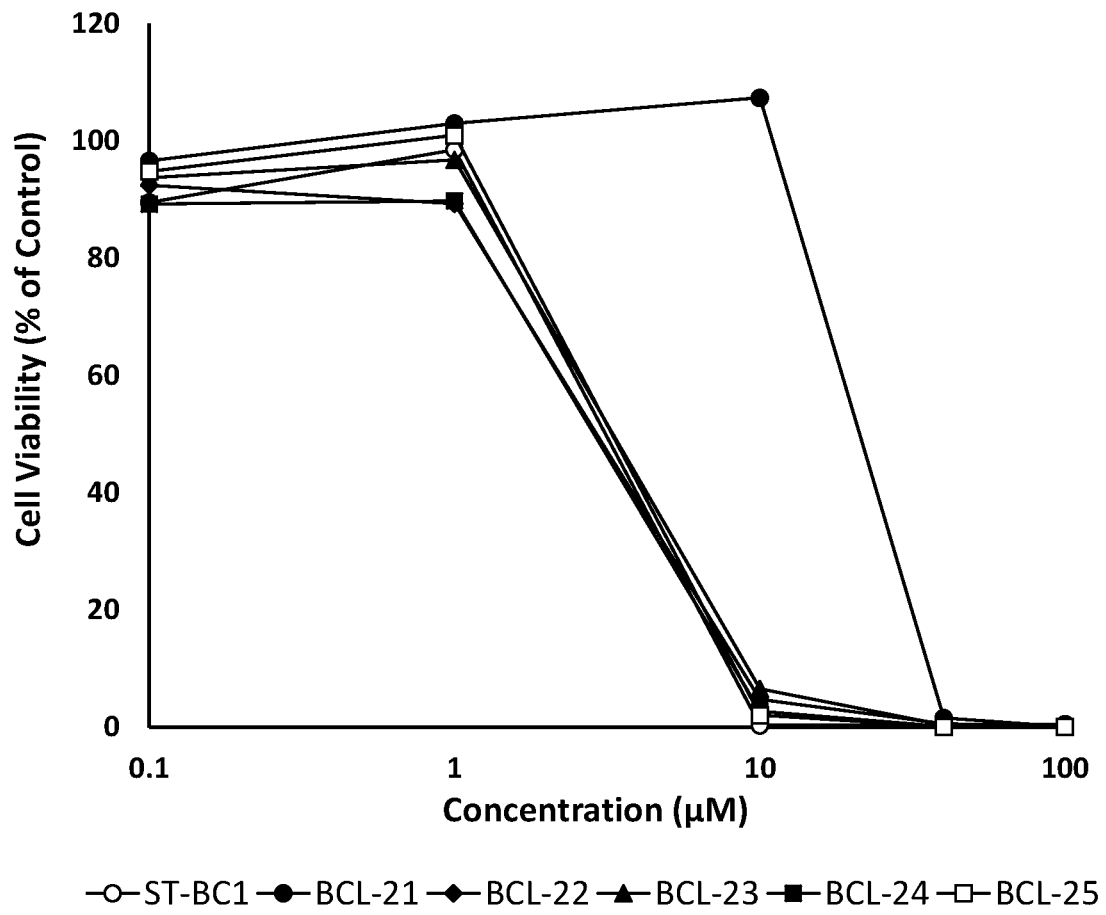
FIG. 1 shows that modified BCL9 mimetic peptides of the invention antagonize β-catenin and exert anti-proliferative activity in cultured MCF7 breast cancer cells.
Figure 2A:
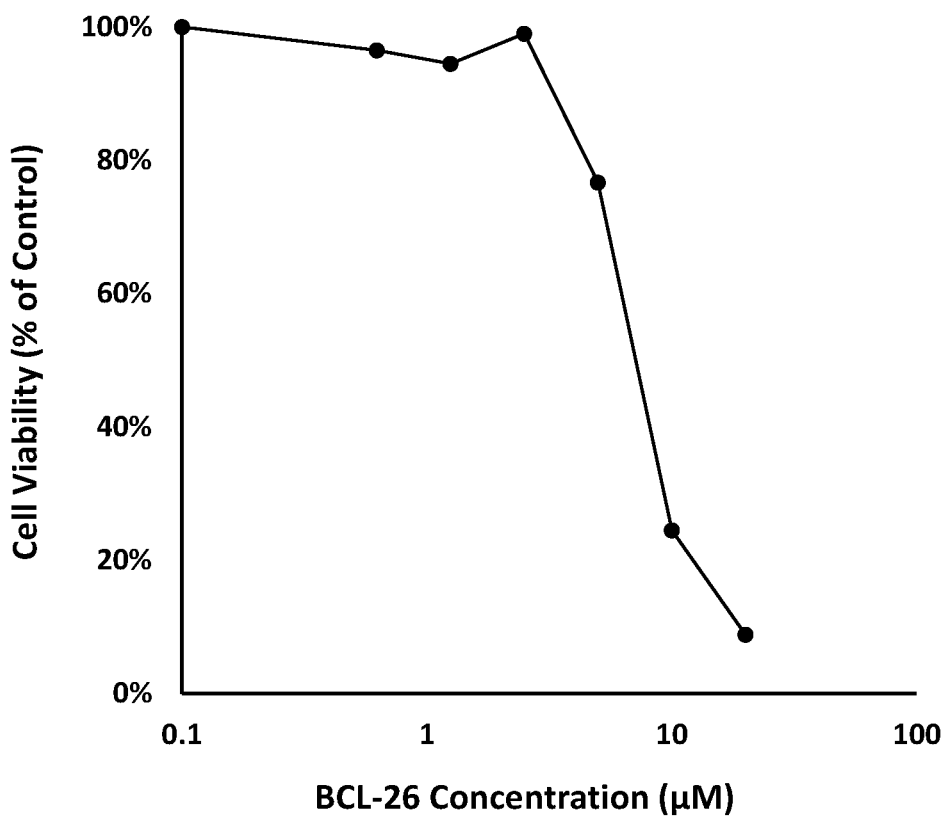
FIG. 2A-2B show that retro inverso BCL9 mimetic peptides of the invention display anti-proliferative activity in cultured MCF7 breast cancer cells. Cytotoxicity data is shown for peptide BCL-26 (FIG. 2A) and peptide BCL-27 (FIG. 2B).
Figure 2B:
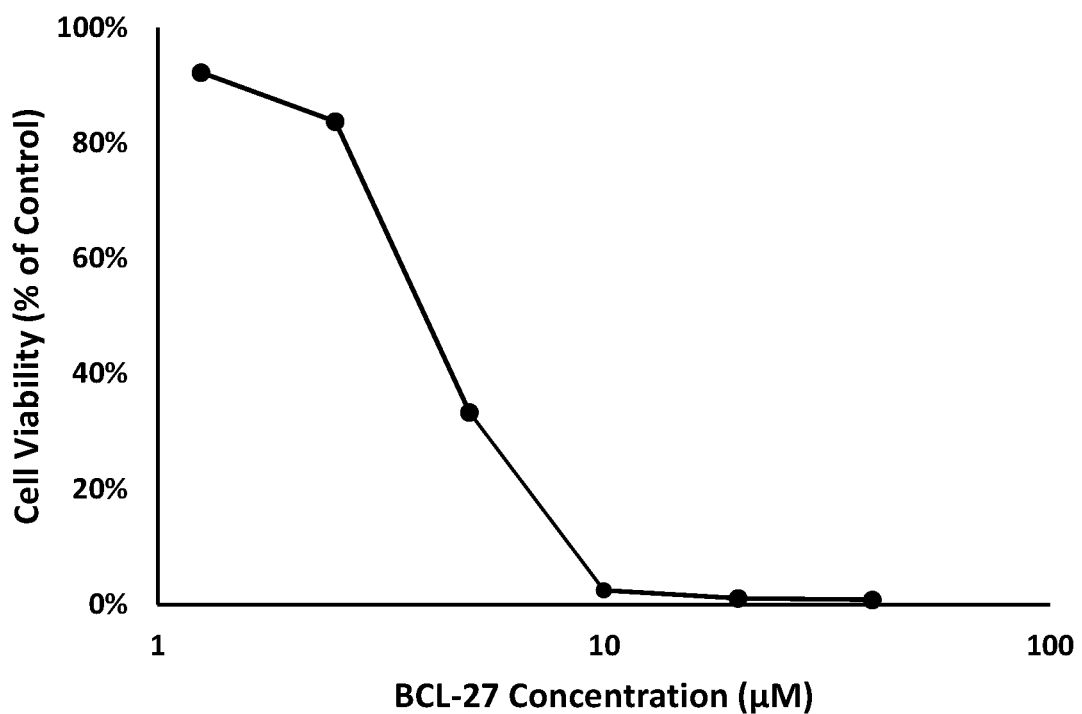

The practice of the present invention will employ, unless otherwise indicated, conventional techniques of pharmaceutics, formulation science, protein chemistry, cell biology, cell culture, molecular biology, microbiology, recombinant DNA, and immunology, which are within the skill of the art.

In order that the present invention can be more readily understood, certain terms are first defined. Additional definitions are set forth throughout the disclosure. Unless defined otherwise, all technical and scientific terms used herein have the same meaning as commonly understood by one of ordinary skill in the art to which this invention is related.

Any headings provided herein are not limitations of the various aspects or embodiments of the invention, which can be had by reference to the specification as a whole. Accordingly, the terms defined immediately below are more fully defined by reference to the specification in its entirety.

All of the references cited in this disclosure are hereby incorporated by reference in their entireties. In addition, any manufacturers' instructions or catalogues for any products cited or mentioned herein are incorporated by reference. Documents incorporated by reference into this text, or any teachings therein, can be used in the practice of the present invention. Documents incorporated by reference into this text are not admitted to be prior art.

I. Definitions

The phraseology or terminology in this disclosure is for the purpose of description and not of limitation, such that the terminology or phraseology of the present specification is to be interpreted by the skilled artisan in light of the teachings and guidance.

As used in this specification and the appended claims, the singular forms "a," "an," and "the" include plural referents, unless the context clearly dictates otherwise. The terms "a" (or "an") as well as the terms "one or more" and "at least one" can be used interchangeably.

Furthermore, "and/or" is to be taken as specific disclosure of each of the two specified features or components with or without the other. Thus, the term "and/or" as used in a phrase such as "A and/or B" is intended to include A and B, A or B, A (alone), and B (alone). Likewise, the term "and/or" as used in a phrase such as "A, B, and/or C" is intended to include A, B, and C; A, B, or C; A or B; A or C; B or C; A and B; A and C; B and C; A (alone); B (alone); and C (alone).

Wherever embodiments are described with the language "comprising," otherwise analogous embodiments described in terms of "consisting of" and/or "consisting essentially of" are included.

Units, prefixes, and symbols are denoted in their Système International de Unites (SI) accepted form. Numeric ranges are inclusive of the numbers defining the range, and any individual value provided herein can serve as an endpoint for a range that includes other individual values provided herein. For example, a set of values such as 1, 2, 3, 8, 9, and 10 is also a disclosure of a range of numbers from 1-10, from 1-8, from 3-9, and so forth. Likewise, a disclosed range is a disclosure of each individual value encompassed by the range. For example, a stated range of 5-10 is also a disclosure of 5, 6, 7, 8, 9, and 10.

The terms "polypeptide," "peptide," and "protein" are used interchangeably herein to refer to polymers of amino acids of any length. The polymer can be linear or branched, can comprise modified amino acids, and can be interrupted by non-amino acids. Except where indicated otherwise, e.g., for the abbreviations for the uncommon or unnatural amino acids set forth herein, the three-letter and one-letter abbreviations, as used in the art, are used herein to represent amino acid residues. Except when preceded with a "D" or in lower case, the amino acid is an L-amino acid. Groups or strings of amino acid abbreviations are used to represent peptides. Except where specifically indicated, peptides are indicated with the N-terminus of the left and the sequence is written from the N-terminus to the C-terminus.

Polypeptides, peptides, and proteins can encompass natural or synthetic modifications, for example, disulfide bonds, lactam bridges, glycosylation, lipidation, acetylation, acylation, amidation, phosphorylation, or other manipulation or modification, such as conjugation with a labeling component or addition of a protecting group. Also included are, for example, polypeptides containing one or more analogs of an amino acid (including, for example, amino-isobutyric acid (Aib), unnatural amino acids, such as naphthylalanine (Nal), etc.) and polypeptides comprising or consisting of D-amino acids, as well as other modifications known in the art. Polypeptides can be in one or multiple salt forms. Preferred salt forms include acetate, chloride or trifluoroacetate. In certain embodiments, the polypeptides can occur as single chains, covalent dimers, or non-covalent associated chains. Polypeptides can also be in cyclic form. Cyclic polypeptides can be prepared, for example, by bridging free amino and free carboxyl groups. Formation of the cyclic compounds can be achieved by treatment with a dehydrating agent, with suitable protection if needed. The open chain (linear form) to cyclic form reaction can involve intramolecular-cyclization. Cyclic polypeptides can also be prepared by other methods known in the art, for example, using one or more lactam bridges, hydrogen bond surrogates (Patgiri et al. 2008), hydrocarbon staples (Schafmeister et al. 2000), triazole staples (Le Chevalier Isaad et al. 2009), or disulfide bridges (Wang et al. 2006). Bridges or staples can be spaced, for example, 3, 4, 7, or 8 amino acids apart.

The term "variant" refers to a polypeptide having one or more amino acid substitutions, deletions, and/or insertions compared to a reference sequence. Deletions and insertions can be internal and/or at one or more termini. Substitution can include the replacement of one or more amino acids with a similar or homologous amino acid(s) or a dissimilar amino acid(s). For example, some variants include alanine substitutions at one or more amino acid positions. Other substitutions include conservative substitutions that have little or no effect on the overall net charge, polarity, or hydrophobicity of the protein. Some variants include non-conservative substitutions that change the charge or polarity of the amino acid. Substitution can be with either the L- or the D-form of an amino acid.

A "retro inverso" polypeptide has a reversed amino acid sequence, relative to a native L-amino acid sequence, and is made up of D-amino acids (inverting the α-center chirality of the amino acid subunits) to help maintain side-chain topology similar to that of the original L-amino acid peptide.

The term "conservative substitution" as used herein denotes that one or more amino acids are replaced by another, biologically similar residue. Examples include substitution of amino acid residues with similar characteristics, e.g., small amino acids, acidic amino acids, polar amino acids, basic amino acids, hydrophobic amino acids, and aromatic amino acids. For further information concerning phenotypically silent substitutions in peptides and proteins, see, for example, Bowie et. al., *Science* 247:1306-1310 (1990). In the table below, conservative substitutions of amino acids are grouped by physicochemical properties; I: neutral and/or hydrophilic, II: acids and amides, III: basic, IV: hydrophobic, V: aromatic, bulky amino acids.

TABLE I

| I | II | III | IV | V |
|---|----|-----|----|---|
| A | N  | H   | M  | F |
| S | D  | R   | L  | Y |
| T | E  | K   | I  | W |
| P | Q  |     | V  |   |
| G |    |     | C  |   |

In the table below, conservative substitutions of amino acids are grouped by physicochemical properties; VI: neutral or hydrophobic, VII: acidic, VIII: basic, IX: polar, X: aromatic.

TABLE II

| VI | VII | VIII | IX | X |
|----|-----|------|----|---|
| A  | D   | H    | M  | F |
| L  | E   | R    | S  | Y |
| I  |     | K    | T  | W |
| V  |     |      | N  | H |
| P  |     |      | Q  |   |
| G  |     |      | C  |   |

Methods of identifying conservative nucleotide and amino acid substitutions which do not affect protein function are well-known in the art (see, e.g., Brummell et al., *Biochem.* 32:1180-1187 (1993); Kobayashi et al., *Protein Eng.* 12(10):879-884 (1999); and Burks et al., *Proc. Natl. Acad. Sci. U.S.A.* 94:412-417 (1997)).

The terms "identical" or percent "identity" in the context of two or more nucleic acids or polypeptides, refers to two or more sequences or subsequences that are the same or have a specified percentage of nucleotides or amino acid residues that are the same, when compared and aligned (introducing gaps, if necessary) for maximum correspondence, not considering any conservative amino acid substitutions as part of the sequence identity. The percent identity can be measured using sequence comparison software or algorithms, or by visual inspection. Various algorithms and software are known in the art that can be used to obtain alignments of amino acid or nucleotide sequences.

One such non-limiting example of a sequence alignment algorithm is described in Karlin et al., *Proc. Natl. Acad. Sci.*, 87:2264-2268 (1990), as modified in Karin et al., *Proc. Natl. Acad. Sci.*, 90:5873-5877 (1993), and incorporated into the NBLAST and XBLAST programs (Altschul et al., *Nucleic Acids Res.*, 25:3389-3402 (1991)). In certain embodiments, Gapped BLAST can be used as described in Altschul et al., *Nucleic Acids Res.* 25:3389-3402 (1997). BLAST-2, WU-BLAST-2 (Altschul et al., *Methods in Enzymology*, 266:460-480 (1996)), ALIGN, ALIGN-2 (Genentech, South San Francisco, California) or Megalign (DNASTAR) are additional publicly available software programs that can be used to align sequences. In certain embodiments, the percent identity between two nucleotide sequences is determined using the GAP program in the GCG software package (e.g., using a NWSgapdna.CMP matrix and a gap weight of 40, 50, 60, 70, or 90 and a length weight of 1, 2, 3, 4, 5, or 6). In certain alternative embodiments, the GAP program in the GCG software package, which incorporates the algorithm of Needleman and Wunsch (*J. Mol. Biol.* (48):444-453 (1970)), can be used to determine the percent identity between two amino acid sequences (e.g., using either a BLOSUM 62 matrix or a PAM250 matrix, and a gap weight of 16, 14, 12, 10, 8, 6, or 4 and a length weight of 1, 2, 3, 4, 5). Alternatively, in certain embodiments, the percent identity between nucleotide or amino acid sequences is determined using the algorithm of Myers and Miller (*CABIOS* 4:11-17 (1989)). For example, the percent identity can be determined using the ALIGN program (version 2.0) and using a PAM120 with residue table, a gap length penalty of 12 and a gap penalty of 4. One skilled in the art can determine appropriate parameters for maximal alignment by particular alignment software. In certain embodiments, the default parameters of the alignment software are used. Other resources for calculating identity include methods described in *Computational Molecular Biology* (Lesk ed., 1988); *Biocomputing: Informatics and Genome Projects* (Smith ed., 1993); *Computer Analysis of Sequence Data, Part 1* (Griffin and Griffin eds., 1994); *Sequence Analysis in Molecular Biology* (G. von Heinje, 1987); *Sequence Analysis Primer* (Gribskov et al. eds., 1991); and Carillo et al., *SIAM J. Applied Math.*, 48:1073 (1988).

A "polynucleotide," as used herein can include one or more "nucleic acids," "nucleic acid molecules," or "nucleic acid sequences," and refers to a polymer of nucleotides of any length, and includes DNA and RNA. The polynucleotides can be deoxyribonucleotides, ribonucleotides, modified nucleotides or bases, and/or their analogs, or any substrate that can be incorporated into a polymer by DNA or RNA polymerase. A polynucleotide can comprise modified nucleotides, such as methylated nucleotides and their analogs. The preceding description applies to all polynucleotides referred to herein, including RNA and DNA.

An "isolated" molecule is one that is in a form not found in nature, including those which have been purified.

A "label" is a detectable compound that can be conjugated directly or indirectly to a molecule, so as to generate a "labeled" molecule. The label can be detectable on its own (e.g., radioisotope labels or fluorescent labels), or can be indirectly detected, for example, by catalyzing chemical alteration of a substrate compound or composition that is detectable (e.g., an enzymatic label) or by other means of indirect detection (e.g., biotinylation).

"Binding affinity" generally refers to the strength of the sum total of non-covalent interactions between a single binding site of a molecule and its binding partner (e.g., a receptor and its ligand, an antibody and its antigen, two monomers that form a dimer, etc.). Unless indicated otherwise, as used herein, "binding affinity" refers to intrinsic binding affinity which reflects a 1:1 interaction between members of a binding pair. The affinity of a molecule X for its partner Y can generally be represented by the dissociation constant ($K_D$). Affinity can be measured by common methods known in the art, including those described herein. Low-affinity binding partners generally bind slowly and tend to dissociate readily, whereas high-affinity binding partners generally bind faster and tend to remain bound longer.

The affinity or avidity of a molecule for its binding partner can be determined experimentally using any suitable method known in the art, e.g., flow cytometry, enzyme-linked immunosorbent assay (ELISA), or radioimmunoassay (RIA), or kinetics (e.g., KINEXA® or BIACORE™ or OCTET® analysis). Direct binding assays as well as competitive binding assay formats can be readily employed. (See, e.g., Berzofsky et al., "Antibody-Antigen Interactions," In *Fundamental Immunology*, Paul, W. E., ed., Raven Press: New York, N.Y. (1984); Kuby, *Immunology*, W. H. Freeman and Company: New York, N.Y. (1992)). The measured affinity of a particular binding pair interaction can vary if measured under different conditions (e.g., salt concentration, pH, temperature). Thus, measurements of affinity and other binding parameters (e.g., $K_D$ or Kd, $K_{on}$, $K_{off}$) are made with standardized solutions of binding partners and a standardized buffer, as known in the art.

An "active agent" is an ingredient that is intended to furnish biological activity. The active agent can be in association with one or more other ingredients. An active agent that is a peptide can also be referred to as an "active peptide."

An "effective amount" of an active agent is an amount sufficient to carry out a specifically stated purpose.

The term "pharmaceutical composition" refers to a preparation that is in such form as to permit the biological activity of the active ingredient to be effective and which contains no additional components that are unacceptably toxic to a subject to which the composition would be administered. Such composition can be sterile and can comprise a pharmaceutically acceptable carrier, such as physiological saline. Suitable pharmaceutical compositions can comprise one or more of a buffer (e.g. acetate, phosphate or citrate buffer), a surfactant (e.g. polysorbate), a stabilizing agent (e.g. polyol or amino acid), a preservative (e.g. sodium benzoate), and/or other conventional solubilizing or dispersing agents.

The terms "inhibit," "block," and "suppress" are used interchangeably and refer to any statistically significant decrease in occurrence or activity, including full blocking of the occurrence or activity. For example, "inhibition" can refer to a decrease of about 10%, 20%, 30%, 40%, 50%, 60%, 70%, 80%, 90% or 100% in activity or occurrence. An "inhibitor" is a molecule, factor, or substance that produces a statistically significant decrease in the occurrence or activity of a process, pathway, or molecule.

A "neoplastic cell" or "neoplasm" typically has undergone some form of mutation/transformation, resulting in abnormal growth as compared to normal cells or tissue of the same type. Neoplasms include morphological irregularities, as well as pathologic proliferation. Neoplastic cells can be benign or malignant. Malignant neoplasms, i.e., cancers, are distinguished from benign in that they demonstrate loss of differentiation and orientation of cells, and have the properties of invasion and metastasis.

II. BCL9 Mimetic Peptides and Compositions

BCL9 Mimetic Peptides

BCL9 is a 149 kDa eukaryotic protein involved in signal transduction through the Wnt pathway. BCL9 binds to and promotes the transcriptional activity of β-catenin. The β-catenin binding region or "HD2 domain" of BCL9 is 24-residue α-helix at amino acids 351-374 of BCL9 (SEQ ID NO: 1). The full amino acid sequence of wild-type human BCL9 is set forth in NCBI Accession No. NP_004317.2.

Peptide ST-BC1 (SEQ ID NO:2) is a cyclic variant of the native BCL9 HD2 domain having a lactam bridge between residues 14 and 18. Previous studies demonstrated that an analogue of ST-BC1 having a hydrocarbon bridge between residues 14 and 18 inhibits Wnt transcriptional activity in human colon carcinoma cells and displays anti-tumor activity in mouse models (Takada el al. 2012). The present inventors have discovered that non-conservative and linear variants of ST-BC1 induce cell death in neoplastic cells and reduce tumor volume in an animal model. The discovery that the BCL9-derived peptides of the present invention retain their ability to specifically target and kill neoplastic cells with multiple non-conservative amino acid substitutions to the wild-type BCL9 HD2 region could not have been predicted prior to the present invention. Further a retro inverso variant was not only active, but had comparable activity relative to ST-BC1 and linear "L" variants, which also could not have been predicted.

The invention provides BCL9 mimetic peptides having a modified BCL9 HD2 region and, optionally, a cell-penetrating region. BCL9 peptides of the invention are "mimetics," meaning that they are capable of interfering with or inhibiting wild-type BCL9 activity in a cell into which they are introduced. More specifically, the BCL9 mimetic peptides of the invention are capable of binding to β-catenin and competing with native BCL9 binding to β-catenin. In some embodiments, the BCL9 mimetic peptides can downregulate expression of one or more members of the Wnt signaling pathway, for example, axin, CD44, c-Myc, cyclin D1, LEF1, LGR5, survivin, and VEGF-A. In some embodiments, the BCL9 mimetic peptide can inhibit cell proliferation, angiogenesis, and/or cell migration. BCL9 activity can be assessed by any of several assays known in the art (Kawamoto et al. 2009; WO 2017/062518), including the cell-kill assays described herein.

A "modified BCL9 HD2 region" is a sequence derived from the wild-type BCL9 HD2 region, which sequence has at least one addition, deletion, or substitution relative to the wild-type BCL9 HD2 sequence. The modified BCL9 HD2 region preferably comprises a peptide corresponding to at least positions 16-23 of SEQ ID NO: 1 and comprising at least one addition, deletion, or substitution relative to SEQ ID NO: 1. The modified BCL9 HD2 region can comprise, for example, an amino acid sequence shown in Table 1. The native BCL9 HD2 sequence (SEQ ID NO: 1) is shown as a point of reference. Substitutions in SEQ ID NO:1 are shown in underlined bold type.

TABLE 1

| SEQ ID NO | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | L | S | Q | E | Q | L | E | H | R | E | R | S | L | Q | T | L | R | D | I | Q | R | M | L | F |
| 3 | L | S | Q | E | Q | L | E | H | R | E | R | S | L | A | T | L | R | A | I | Q | R | M | L | F |
| 4 | L | S | Q | E | Q | L | R | H | R | E | E | S | L | E | T | L | R | R | I | Q | R | M | L | F |
| 5 | L | S | Q | E | Q | L | E | H | R | E | R | A | L | Q | A | L | R | A | I | Q | R | A | L | F |
| 6 |   |   |   |   |   |   |   |   |   |   |   |   | A | L | Q | A | L | R | A | I | Q | R | A | L | F |

The modified BCL9 HD2 region can be a retro inverso form and can have, for example, a D-amino acid sequence X$_1$LX$_2$X$_3$QLX$_4$X$_5$LX$_6$X$_7$LA (SEQ ID NO: 142), wherein each amino acid at positions 1-13 is independently selected from those shown in Table 2.

TABLE 2

| 1 | 2 | 3 | 4 | 5 | 6 | 7 | 8 | 9 | 10 | 11 | 12 | 13 |
|---|---|---|---|---|---|---|---|---|---|---|---|---|
| F | L | A | A | Q | L | A | A | L | A | A | L | A |
| L |   | E | K |   |   | D | K |   | K | K |   |   |
| W |   | L | R |   |   | E | R |   | Q | Q |   |   |
|   |   | M | O |   |   |   | O |   | R | R |   |   |
|   |   | V |   |   |   |   | T |   |   |   |   |   |

In the D-amino acid HD2 domain sequences shown in Table 2, only one of positions 4 or 8 can be alanine, i.e., if position 4 is A, position 8 is not A, and vice versa. The BCL9 HD2 region can optionally comprise at position −1 a D-amino acid or an L-amino acid selected from the group consisting of F, 1-Nal, 2-Nal, R, and W. The BCL9 HD2 region can further optionally comprise a D-amino acid or an L-amino acid selected from the group consisting of F, 1-Nal, 2-Nal, and W at position −2. In one embodiment, if position −1 is R, position 1 is F or W and/or position −2 is F, 1-Nal, 2-Nal, or W.

Specific examples of retro inverso BCL9 HD2 regions are shown in Table 3. The retro inverso sequence of a portion of the wild-type BCL9 HD2 region (SEQ ID NO: 7) is shown as a point of reference. Substitutions in SEQ ID NO: 7 are shown in underlined bold type.

TABLE 3

| SEQ ID NO | −1 | 1 | 2 | 3 | 4 | 5 | 6 | 7 | 8 | 9 | 10 | 11 | 12 | 13 |
|---|---|---|---|---|---|---|---|---|---|---|---|---|---|---|
| 7 |   | F | L | M | R | Q | I | D | R | L | T | Q | L | S |
| 8 |   | F | L | M | R | Q | I | D | R | L | T | Q | L | A |
| 9 |   | F | L | M | R | Q | L | D | R | L | T | Q | L | A |
| 10 |   | F | L | A | R | Q | L | A | R | L | A | Q | L | A |
| 11 |   | W | L | A | R | Q | L | A | R | L | A | Q | L | A |
| 12 | W | W | L | A | R | Q | L | A | R | L | A | Q | L | A |
| 13 |   | F | L | M | E | Q | L | R | R | L | T | E | L | A |
| 14 |   | F | L | A | E | Q | L | R | R | L | A | E | L | A |
| 15 |   | W | L | A | E | Q | L | R | R | L | A | E | L | A |
| 16 | W | W | L | A | R | Q | L | E | R | L | A | Q | L | A |
| 17 | 1N* | W | L | A | R | Q | L | A | R | L | R | Q | L | A |
| 18 |   | F | L | L | R | Q | I | D | R | L | T | Q | L | A |
| 19 |   | F | L | L | R | Q | L | D | R | L | T | Q | L | A |
| 20 |   | F | L | L | R | Q | L | E | R | L | T | Q | L | A |
| 102 | W | W | L | L | R | Q | L | A | R | L | A | Q | L | A |
| 115 | 2N* | W | L | A | R | Q | L | A | R | L | A | Q | L | A |
| 116 | F | W | L | A | R | Q | L | A | R | L | A | Q | L | A |
| 117 | W | W | L | A | R | Q | L | A | R | L | R | Q | L | A |
| 118 | W | F | L | A | R | Q | L | A | R | L | A | Q | L | A |
| 119 | W | L | L | A | R | Q | L | A | R | L | A | Q | L | A |
| 120 | W | W | L | E | R | Q | L | A | R | L | A | Q | L | A |
| 122 | W | W | L | A | R | Q | L | A | R | L | Q | Q | L | A |
| 123 | W | W | L | A | R | Q | L | E | R | L | A | R | L | A |
| 124 | W | W | L | A | R | Q | L | E | R | L | R | R | L | A |
| 125 | W | W | L | A | R | Q | L | A | R | L | K | Q | L | A |
| 126 | W | W | L | A | R | Q | L | E | R | L | A | K | L | A |
| 127 | W | W | L | V | R | Q | L | A | R | L | A | Q | L | A |
| 140 | W | W | L | A | O* | Q | L | A | O* | L | A | Q | L | A |

*1N = 1-Naphthylalanine;
2N = 2-Naphthyalanine;
O = Ornithine

The modified BCL9 HD2 region can comprise additional D-amino acids corresponding to the full retro inverso sequence of SEQ ID NO: 1. For example, the modified BCL9 HD2 region can comprise the D-amino acid sequence WW L A RQLA RL A QL A RERHELQEQSL (SEQ ID NO: 121), wherein substitutions and additions relative to the retro inverso wild-type BCL9 HD2 sequence are shown in underlined bold type.

The modified BCL9 HD2 region can comprise amino acids of mixed chirality, such that one or more amino acids in the peptide are in the L form and one or more amino acids are in the D form. For example, an L-peptide can comprise one or more D-amino acids. Likewise, a retro inverso D-peptide can comprise one or more L-amino acids. In certain embodiments, the BCL9 HD2 region has a sequence selected from the group consisting of:

(i) F $_D$R$_L$[W L A RQLA RL A QL A ]$_D$
(SEQ ID NO: 103);
(ii) F $_D$R$_L$[W L V RQLA RL A QL A ]$_D$
(SEQ ID NO: 104);
(iii) F $_D$W$_L$[W L V RQLA RL A QL A ]$_D$
(SEQ ID NO: 105);
(iv) F $_D$W$_L$[W L A RQLA RLAA L A ]$_D$
(SEQ ID NO: 106);
(v) F $_D$W$_L$[W L A RQLAA L A QL A ]$_D$
(SEQ ID NO: 107);
(vi) W$_L$-[W L A RQLARL A QL A ]$_D$
(SEQ ID NO: 108);
(vii) W$_L$-[W L A RQLA RLR QL A ]$_D$
(SEQ ID NO: 109);
(viii) W$_L$-[W L A RQLE RL RR L A ]$_D$
(SEQ ID NO: 110);
(ix) W$_L$-[W L A RQLE RL AR L A ]$_D$
(SEQ ID NO: 111);
(x) F$_L$-[W L A RQLA RL A QL A ]$_D$
(SEQ ID NO: 112);
(xi) R$_L$-[W L A RQLA RL A QL A ]$_D$
(SEQ ID NO: 113);

glycol, and derivatives thereof. Linkers can be cleavable after the peptide is delivered into a cell. An active peptide and a modified BCL9 HD2 region linked directly by an amide bond may be referred to as a "fusion." Fusions can contain an amino acid linker sequence between the active peptide and the modified BCL9 HD2 region, as discussed above with respect to active peptides. The active peptide can be linked to the N-terminus or the C-terminus of the modified BCL9 HD2 region, or via a residue side chain. The active peptide and modified BCL9 HD2 region can have the same or opposite chirality.

Cell-penetrating BCL9 mimetic peptides of the invention can comprise any combination of cell-penetrating and modified BCL9 HD2 regions disclosed herein. Non-limiting examples of such peptides are shown in Table 4. The cell-penetrating region is italicized. Peptide BCL-21 comprises the native BCL9 HD2 sequence and is inefficient at inhibiting cell proliferation. Substitutions relative to the native BCL9 HD2 sequence are shown in underlined bold type.

TABLE 4

| Peptide | SEQ ID NO: | -11 | -10 | -9 | -8 | -7 | -6 | -5 | -4 | -3 | -2 | -1 | 1 | 2 | 3 | 4 | 5 | 6 |
|---|---|---|---|---|---|---|---|---|---|---|---|---|---|---|---|---|---|---|
| BCL-21 | 21 | Y | G | R | K | K | R | R | Q | R | R | R | L | S | Q | E | Q | L |
| BCL-22 | 22 | Y | G | R | K | K | R | R | Q | R | R | R | L | S | Q | E | Q | L |
| BCL-23 | 23 | Y | G | R | K | K | R | R | Q | R | R | R | L | S | Q | E | Q | L |
| BCL-24 | 24 | Y | G | R | K | K | R | R | Q | R | R | R | L | S | Q | E | Q | L |
| BCL-25 | 25 |  |  |  |  |  |  |  |  |  |  |  | Y | G | R | K | K | R |

| Peptide | SEQ ID NO: | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|
| BCL-21 | 21 | E | H | R | E | R | S | L | Q | T | L | R | D | I | Q | R | M | L | F |
| BCL-22 | 22 | E | H | R | E | R | S | L | A | T | L | R | A | I | Q | R | M | L | F |
| BCL-23 | 23 | R | H | R | E | E | S | L | E | T | L | R | R | I | Q | E | M | L | F |
| BCL-24 | 24 | E | H | R | E | R | A | L | Q | A | L | R | A | I | Q | R | A | L | F |
| BCL-25 | 25 | R | Q | R | R | R | A | L | Q | A | L | R | A | I | Q | R | A | L | F |

-continued (xii) F$_D$-W$_L$-[W L A RQLA RL A QL A ]$_D$
(SEQ ID NO: 114); and
(xiii) W$_L$-[W L V RQLA RL A QL A ]$_D$
(SEQ ID NO: 141);

wherein D and L subscripts denote chirality of the amino acids, and wherein substitutions and additions relative to the retro inverso wild-type BCL9 HD2 sequence (SEQ ID NO: 7) are shown in underlined bold type.

Variants of these sequences are also included in the scope of the invention. BCL9 mimetic peptides of the invention can have an HD2 region of at least about 60%, 61%, 62%, 63%, 64%, 65%, 66%, 67%, 68%, 69%, 70%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% identity to those sequences disclosed herein.

In embodiments wherein the BCL9 mimetic peptide comprises another active peptide, such as a cell-penetrating region or an RGD-like sequence, the active peptide is operably linked to the modified BCL9 HD2 region. In some embodiments, the active peptide is covalently linked to the modified BCL9 HD2 region, for example, via a peptide bond, a disulfide bond, a thioether bond, or a linker known in the art. Exemplary linkers include, but are not limited to, a substituted alkyl, a substituted cycloalkyl, polyethylene Retro inverso forms of BCL9 mimetic peptides are also included. Exemplary embodiments of cell-penetrating retro inverso BCL9 mimetic peptides are shown in Table 5.

TABLE 5

| Peptide | SEQ ID NO: | D-Amino Acid Sequence |
|---|---|---|
| BCL-26 | 26 | FLMRQLDRLTQLAKLTPV |
| BCL-27 | 27 | WW*LARQ*LARLAQLAKLTPV |
| BCL-76 | 76 | WW*LARQ*LERLAQLAKLTPV |
| BCL-77 | 77 | 1-Nal-W*LARQ*LARLAQLAKLTPV |
| BCL-78 | 78 | 2-Nal-W*LARQ*LARLAQLAKLTPV |
| BCL-79 | 79 | FW*LARQ*LARLAQLAKLTPV |
| BCL-80 | 80 | WW*LARQ*LARLRQLAKLTPV |
| BCL-81 | 81 | W$_F$*LARQ*LARLAQLAKLTPV |
| BCL-82 | 82 | W$_L$*LARQ*LARLAQLAKLTPV |
| BCL-83 | 83 | WW*LERQ*LARLAQLAKLTPV |
| BCL-84 | 84 | WW*LARQ*LARLAQLARERHELQEQSL*KLTPV |

TABLE 5-continued

| Peptide | SEQ ID NO: | D-Amino Acid Sequence |
|---|---|---|
| BCL-85 | 85 | WW*LARQLARLQQLA*KLTPV |
| BCL-86 | 86 | WW*LARQLERIARLA*KLTPV |
| BCL-87 | 87 | *PSDGRWWLARQLARLAQLA*KLTPV |
| BCL-88 | 88 | WW*LARQLERIRRLA*KLTPV |
| BCL-89 | 89 | WW*LARQLARLKQLA*KLTPV |
| BCL-90 | 90 | WW*LARQLERIAKLA*KLTPV |
| BCL-91 | 91 | WW*LVRQLARLAQLA*KLTPV |
| BCL-92 | 92 | *PSDGRWWLARQLARLAQLA* |
| BCL-93 | 93 | WW*LAARQLARLAQLAPSDGRG* |
| BCL-94 | 94 | W*LARQLARLVAQLA*KLTPV |
| BCL-128 | 128 | WW*I*LRQLARLAQLA*KLTPV |
| BCL-135 | 135 | *PSDGRWWLARQLARLAQLA*KLTPV |
| BCL-136 | 136 | *PSDGRWWLVRQLARLAQLA*KLTPV |
| BCL-137 | 137 | *PSDGRWWIAQQLAQLAQLA*QLTPV |

The cell-penetrating and RGD-like regions are italicized. Substitutions and additions relative to the retro inverso wild-type BCL9 HD2 sequence (SEQ ID NO: 7) are shown in underlined bold type. The invention also includes peptides comprising the BCL9 HD2 regions shown in Table 5 and a different active peptide, such as a different cell-penetrating region, and peptides comprising the BCL9-HD2 regions shown in Table 5 without an active peptide.

BCL9 mimetic peptides of the invention can comprise amino acids of mixed chirality, such that one or more amino acids in the peptide are in the L form and one or more amino acids are in the D form. Non-limiting examples of BCL9 mimetic peptides having mixed chirality are shown in Table 6.

TABLE 6

| Peptide | SEQ ID NO: | Amino Acid Sequence |
|---|---|---|
| BCL-95 | 95 | $W_L$-[WIARQLARIAQIAKLTPV]$_D$ |
| BCL-96 | 96 | $W_L$-[WIARQLARIRQIAKLTPV]$_D$ |
| BCL-97 | 97 | $W_L$-[WIARQLERIRRIAKLTPV]$_D$ |
| BCL-98 | 98 | $W_L$-[WIARQLERIARIAKLTPV]$_D$ |
| BCL-99 | 99 | $F_L$-[WIARQLARIAQIAKLTPV]$_D$ |
| BCL-100 | 100 | $R_L$-[WIARQLARIAQIAKLTPV]$_D$ |
| BCL-101 | 101 | $F_D$-$W_L$-[WIARQLARIAQIAKLTPV]$_D$ |
| BCL-129 | 129 | $F_D$-$R_L$-[WIARQLARIAQIAKLTPV]$_D$ |
| BCL-130 | 130 | $F_D$-$R_L$-[WLVRQLARIAQIAKLTPV]$_D$ |
| BCL-131 | 131 | $F_D$-$W_L$-[WLVRQLARIAQIAKLTPV]$_D$ |
| BCL-132 | 132 | $F_D$-$W_L$-[WIARQLARIAAIAKLTPV]$_D$ |
| BCL-133 | 133 | $F_D$-$W_L$-[WIARQLAAIAQIAKLTPV]$_D$ |
| BCL-139 | 139 | [*PSDGRG*]$_D$-$W_L$-[WLVRQLARIAQIAKLTPV]$_D$ |

D and L subscripts denote chirality of the amino acids. The cell-penetrating region is italicized. Substitutions and additions relative to the retro inverso wild-type BCL9 HD2 sequence (SEQ ID NO: 7) are shown in underlined bold type. The invention also includes peptides comprising the BCL9 HD2 regions shown in Table 6 and a different active peptide, such as a different cell-penetrating region, and peptides comprising the BCL9-HD2 regions shown in Table 6 without an active peptide.

BCL9 mimetic peptides of the invention include peptides having at least about 80%, 81%, 82%, 83%, 84%, 85%, 86%, 87%, 88%, 89%, 90%, 91%, 92%, 93%, 94%, 95%, 96%, 97%, 98%, or 99% identity to those sequences disclosed herein.

BCL9 mimetic peptides of the invention are preferably 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 amino acids in length, including ranges having any of those lengths as endpoints, for example, 13-35 amino acids.

The BCL9 mimetic peptides can have a modified N-terminus and/or a modified C-terminus. For example, BCL9 mimetic peptides can optionally include an N-terminal acetyl group and/or a C-terminal amide group. Other examples of optional N-terminal and/or C-terminal groups include hydrophobic groups, such as a linear or cyclic $C_2$-$C_{18}$ aliphatic or aromatic hydrocarbon, a naphthyl group, a phenyl group, an octanoyl group, and a valeryl group, including an isovaleryl group. In some embodiments, the BCL9 mimetic peptide comprises a linker or spacer between the peptide and the hydrophobic group. Such linkers or spacers include, for example, aminohexanoic acid, beta-alanine, substituted alkyls, substituted cycloalkyls, and polyethylene glycol.

BCL9 mimetic peptides of the invention can optionally be cyclic. For example, BCL9 mimetic peptides of the invention can include one or more lactam bridges. A lactam bridge is preferably, but not necessarily, created between side chains spaced three, four, seven, or eight amino acid residues apart (i.e., BxxB, BxxxB, BxxxxxxB, BxxxxxxxB). Lactam bridges can be formed, for example, between the side chains of Asp or Glu and Lys or Orn. Amino acid substitutions can be made at the site of the lactam bridge to facilitate the linkage.

BCL9 mimetic peptides of the invention can optionally include one or more epitope and/or affinity tags, such as for purification or detection. Non-limiting examples of such tags include FLAG, HA, His, Myc, GST, and the like. BCL9 mimetic peptides of the invention can optionally include one or more labels.

In certain aspects, the invention provides a composition, e.g., a pharmaceutical composition, comprising a BCL9 mimetic peptide of the invention, optionally further comprising one or more carriers, diluents, excipients, or other additives.

Also within the scope of the invention are kits comprising the BCL9 mimetic peptides and compositions as provided herein and, optionally, instructions for use. The kit can further contain at least one additional reagent, and/or one or more additional active agent. Kits typically include a label indicating the intended use of the contents of the kit. In this context, the term "label" includes any writing or recorded material supplied on or with the kit, or that otherwise accompanies the kit.

The BCL9 mimetic peptides of the invention can be used to inhibit proliferation of and/or to promote cytotoxicity in a neoplastic cell. Proliferation and cytotoxicity can be measured by known assays, including the cell kill assays described herein.

Cell Targeting

BCL9 mimetic peptides of the invention can be introduced into target cells by methods known in the art. The method of introduction chosen will depend, for example, on the intended application.

In some instances, DNA or RNA encoding the BCL9 mimetic peptide can be delivered to and expressed in a target cell. Delivery can be accomplished via any suitable vector, depending on the application. Examples of vectors include plasmid, cosmid, phage, bacterial, yeast, and viral vectors prepared, for example, from retroviruses, including lentiviruses, adenoviruses, adeno-associated viruses, and envelope-pseudotyped viruses. Vectors can be introduced into cells, for example, using nanoparticles, hydrodynamic delivery, electroporation, sonoporation, calcium phosphate precipitation, or cationic polymers such as DEAE-dextran. Vectors can be complexed with lipids, such as encapsulated in liposomes, or associated with cationic condensing agents.

BCL9 mimetic peptides of the invention can be delivered to cells via mechanisms that exploit cellular receptors. Examples of such mechanisms include antibody-drug conjugates, chimeric antigen receptors, multiple antigen presentation (MAP) systems, and integrin-targeting, RGD-like sequences. Examples of RGD-like sequences include GRGDS (SEQ ID NO: 28) and GRGDNP (SEQ ID NO: 29). BCL9 mimetic peptides of the invention can comprise one or more RGD-like sequences, such as two, three, four, or five RGD-like sequences, linked as described herein or by any method known in the art. The one or more RGD-like sequence(s) can be incorporated to the N-terminal or C-terminal side of the BCL9 HD2 region. Such RGD-like sequences can also be in retro inverso form, independently of one another and of the BCL9 HD2 region. One particular example of a retro inverso RGD-like sequence is PSDGRG (SEQ ID NO: 75). Alternatively, BCL9 mimetic peptides can be encapsulated and delivered to cells in vesicles, such as exosomes or liposomes, or in micelles. Another method for introducing BCL9 mimetic peptides into cells is via cyclization, for example, using hydrocarbon staples (Bernal et al. 2007; Bird et al. 2016) or other cyclization methods known in the art.

Certain BCL9 mimetic peptides of the present invention comprise a cell-penetrating domain or cell-penetrating peptide (CPP). The terms "cell-penetrating domain," "cell-penetrating region," and "cell-penetrating peptide" are used interchangeably herein.

CPPs are short (typically about 6-40 amino acids) peptides that are able to cross cell membranes. Many CPPs are capable of crossing the blood-brain barrier (BBB). In some embodiments, the CPP is 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, or 39 amino acids in length, including ranges having any of those lengths as endpoints, for example, 10-30 amino acids. CPPs have the ability to transport covalently or non-covalently linked molecular cargo, such as polypeptides, polynucleotides, and nanoparticles, across cell membranes and the BBB. The translocation can be endocytotic or energy-independent (i.e., non-endocytotic) via translocation. Numerous CPPs are described and characterized in the literature (see, e.g., *Handbook of Cell-Penetrating Peptides* (2d ed. Ulo Langel ed., 2007); Herve et al. 2008; Heitz et al. 2009; Munyendo et al. 2012; Zou et al. 2013; Krautwald et al. 2016). A curated database of CPPs is maintained at crdd.osdd.net/raghava/cppsite (Gautam et al. 2012).

Peptides referred to as nuclear localization sequences (NLSs) are a subset of CPPs. The classical NLS contains one (monopartite) or two (bipartite) regions of basic amino acids. Consensus sequences of classical monopartite and bipartite NLSs are, respectively, K(K/R)X(K/R) (SEQ ID NO: 30) and (K/RXK/R)X$_{10-12}$(K/R)$_{3/5}$ (SEQ ID NO: 31), where 3/5 indicates that at least 3 of 5 consecutive amino acids are lysine or arginine (Kosugi et al. 2009). An NLS sequence from SV40 large T antigen, PKKKRKV (SEQ ID NO: 57), is an example of a classical monopartite NLS, while an NLS sequence from nucleoplasmin, KRPAATKKAGQAKKK (SEQ ID NO: 44) is an example of a classical bipartite NLS (Lange et al. 2007; Kosugi et al. 2009). There are also numerous non-classical NLSs, such as those from ribonucleoproteins (RNPs) hnRNP A1, hnRNP K, and U snRNP (Mattaj et al. 1998).

Non-limiting examples of CPPs suitable for use in the present invention include peptides derived from proteins, such as from *Drosophila* antennapedia transcription factor (Penetratin and its derivatives RL-16 and EB1) (Derossi et al. 1998; Thorén et al. 2000; Lundberg et al. 2007; Alves et al. 2008); from HIV-1 trans-activator of transcription (Tat) (Vivès et al. 1997; Hällbrink et al. 2001); from rabies virus glycoprotein (RVG) (Kumar et al. 2007); from herpes simplex virus VP22 (Elliott et al. 1997); from antimicrobial protegrin 1 (SynB) (Rousselle et al. 2001), from rat insulin 1 gene enhancer protein (pIS1) (Kilk et al. 2001; Magzoub et al. 2001); from murine vascular endothelial cadherin (pVEC) (Elmquist et al. 2001); from human calcitonin (hCT) (Schmidt et al. 1998); and from fibroblast growth factor 4 (FGF4) (Jo et al. 2005). CPPs suitable for use in the invention also include synthetic and chimeric peptides, such as Transportan (TP) and its derivatives (Pooga et al. 1998; Soomets et al. 2000); membrane translocating sequences (MTSs) (Brodsky et al. 1998; Lindgren et al. 2000; Zhao et al. 2001), such as the MPS peptide (also known as fusion sequence-based peptide or FBP) (Chaloin et al. 1998); sequence signal-based peptide (SBP) (Chaloin et al. 1997); model amphipathic peptide (MAP) (Oehlke et al. 1998; Scheller et al. 1999; Hallbrink et al. 2001), translocating peptide 2 (TP2) (Cruz et al. 2013), MPG (Morris et al. 1997; Kwon et al. 2009), Pep-1 (Morris et al. 2001; Muiloz-Morris et al. 2007), and poly-arginine (e.g., R$_7$-R$_{12}$ (SEQ ID NO: 144)) (Mitchell et al. 2000; Wender et al. 2000; Futaki et al. 2001; Suzuki et al. 2002). Representative but non-limiting sequences are shown in Table 7.

TABLE 7

| Peptide | Sequence |
| --- | --- |
| Bax-inhibiting peptide NLS1 | VPTLK (SEQ ID NO: 32) |
| Bax-inhibiting peptide NLS2 | KLPVM (SEQ ID NO: 33) |
| c-Myc NLS | PAAKRVKLD (SEQ ID NO: 34) |
| *C. elegans* SDC3 | FKKFRKF (SEQ ID NO: 35) |
| EB1 CPP | LIRLWSHLIHIWFQNRRLKWKKK (SEQ ID NO: 36) |
| FBP CPP | GALFLGWLGAAGSTMGAWSQPKKKRKV (SEQ ID NO: 37) |
| FGF4 CPP | AAVALLPAVLLALLAP (SEQ ID NO: 38) |
| HATF3 | ERKKRRRE (SEQ ID NO: 39) |
| hCT CPP | LGTYTQDFNKTFPQTAIGVGAP (SEQ ID NO: 40) |
| MAP CPP | KLALKLALKALKAALKLA (SEQ ID NO: 41) |
| MPG CPP | GLAFLGFLGAAGSTMGAWSQPKKKRKV (SEQ ID NO: 42) |
| NF-κB | VQRKRQKLMP (SEQ ID NO: 43) |
| Nucleoplasmin | KRPAATKKAGQAKKK (SEQ ID NO: 44) |
| OCT-6 | GRKRKKRT (SEQ ID NO: 45) |
| Penetratin CPP | RQIKIWFQNRRMKWKK (SEQ ID NO: 46) |
| Penetratin CPP variant 1 | RQLKLWFQNRRMKWKK (SEQ ID NO: 47) |
| Penetratin CPP variant 2 | REIKIWFQNRRMKWKK (SEQ ID NO: 48) |
| Pep-1 CPP | KETWWETWWTEWSQPKKKRKV (SEQ ID NO: 49) |
| pIs1 CPP | PVIRVWFQNKRCKDKK (SEQ ID NO: 50) |
| Poly-Arg CPP | RRRRRR(R)$_{1-6}$ (SEQ ID NO: 51) |
| pVEC CPP | LLIILRRRIRKQAHAH (SEQ ID NO: 52) |
| RL-16 CPP | RRLRRLLRRLLRRLRR (SEQ ID NO: 53) |
| RVG CPP | RVGRRRRRRRRR (SEQ ID NO: 54) |
| R$_6$W$_3$ CPP | RRWWRRWRR (SEQ ID NO: 55) |
| SBP CPP | MGLGLHLLVLAAALQGAWSQPKKKRKV (SEQ ID NO: 56) |
| SV40 | PKKKRKV (SEQ ID NO: 57) |
| SynB1 CPP | RGGRLSYSRRFSTSTGR (SEQ ID NO: 58) |
| SynB3 CPP | RRLSYSRRRF (SEQ ID NO: 59) |
| SynB5 CPP | RGGRLAYLRRRWAVLGR (SEQ ID NO: 60) |
| Tat$^{47-57}$ CPP | YGRKKRRQRRR (SEQ ID NO: 61) |
| Tat$^{47-56}$ CPP | YGRKKRRQRR (SEQ ID NO: 62) |
| Tat$^{48-56}$ CPP | GRKKRRQRR (SEQ ID NO: 63) |
| Tat$^{48-60}$ CPP | GRKKRRQRRRPPQ (SEQ ID NO: 64) |
| TCF1-α | GKKKKRKREKL (SEQ ID NO: 65) |
| TFIIE-β | SKKKKTKV (SEQ ID NO: 66) |
| TP CPP | GWTLNSAGYLLGKINLKALAALAKKIL (SEQ ID NO: 67) |
| TP10 CPP | AGYLLGKINLKALAALAKKIL (SEQ ID NO: 68) |

TABLE 7-continued

| Peptide | Sequence |
|---|---|
| TP2 CPP | PLIYLRLLRGQF (SEQ ID NO: 69) |
| VP22 CPP | DAATATRGRSAASRPTQRPRAPARSASRPRRPVQ (SEQ ID NO: 70) |

Because the function of CPPs depends on their physical characteristics rather than sequence-specific interactions, they can have the reverse sequence and/or reverse chirality as those provided in Table 7 and/or known in the art. For example, retro inverso forms of the CPPs (reverse sequence and reverse chirality) are suitable for use in the invention. Examples of retro inverso CPPs include those having the D-amino acid sequence KKWKMRRNQFWIKIQR (SEQ ID NO: 71), KKWKMRRNQFWLKLQR (SEQ ID NO: 72), RRRQRRKKRGY (SEQ ID NO: 73), KLTPV (SEQ ID NO: 74), or OLTPV (SEQ ID NO: 143). Variants of these sequences with one or more amino acid additions, deletions, and/or substitutions that retain the ability to cross cell membranes and/or the BBB are also suitable for use in the invention. The BCL9 mimetic peptides of the invention can include a cell-penetrating domain having at least about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% identity to the exemplary sequences provided in Table 7. The effect of the amino acid addition(s), deletion(s), and/or substitution(s) on the ability of the CPP to mediate cell penetration can be tested using methods known in the art.

III. Methods of Preparation

BCL9 mimetic peptides of the invention can be chemically synthesized, for example, using solid-phase peptide synthesis or solution-method peptide synthesis, or can be expressed using recombinant methods. Synthesis or expression may occur as fragments of the peptide which are subsequently combined either chemically or enzymatically.

Accordingly, also provided are nucleic acid molecules encoding BCL9 mimetic peptides of the invention. Such nucleic acids can be constructed by chemical synthesis using an oligonucleotide synthesizer. Nucleic acid molecules of the invention can be designed based on the amino acid sequence of the desired BCL9 mimetic peptide and selection of those codons that are favored in the host cell in which the recombinant BCL9 mimetic peptide will be produced. Standard methods can be applied to synthesize a nucleic acid molecule encoding an BCL9 mimetic peptide of interest.

Once prepared, the nucleic acid encoding a particular BCL9 mimetic peptide can be inserted into an expression vector and operably linked to an expression control sequence appropriate for expression of the peptide in a desired host. In order to obtain high expression levels of the BCL9 mimetic peptide, the nucleic acid can be operably linked to or associated with transcriptional and translational expression control sequences that are functional in the chosen expression host.

A wide variety of expression host/vector combinations can be employed to anyone known in the art. Useful expression vectors for eukaryotic hosts include, for example, vectors comprising expression control sequences from SV40, bovine papilloma virus, adenovirus, and cytomegalovirus. Useful expression vectors for bacterial hosts include known bacterial plasmids, such as plasmids from *E. coli*, including pCR1, pBR322, pMB9 and their derivatives, wider host range plasmids, such as M13, and filamentous single-stranded DNA phages.

Suitable host cells include prokaryotes, yeast, insect, or higher eukaryotic cells under the control of appropriate promoters. Prokaryotes include gram negative or gram positive organisms, for example *E. coli* or bacilli. Higher eukaryotic cells can be established or cell lines of mammalian origin, examples of which include *Pichia pastoris*, 293 cells, COS-7 cells, L cells, C127 cells, 3T3 cells, Chinese hamster ovary (CHO) cells, HeLa cells, and BHK cells. Cell-free translation systems can also be employed.

EXAMPLES

Embodiments of the present disclosure can be further defined by reference to the following non-limiting examples. It will be apparent to those skilled in the art that many modifications, both to materials and methods, can be practiced without departing from the scope of the present disclosure.

Example 1. BCL9 Peptides Display Anti-Proliferative Activity in Cancer Cells In Vitro We generated a panel of peptides containing a cell-penetrating region and a BCL9 HD2 domain and compared their activity to a previously described cyclic peptide (Takada et al. 2012), ST-BC1. The BCL9 peptides discussed in this Example are summarized in Table 8.

TABLE 8

| Peptide | Sequence |
|---|---|
| ST-BC1 | LSQEQLEHRERSLKTLREIQRMLF (SEQ ID NO: 2) |
| BCL-21 | YGRKKRRQRRRLSQEQLEHRERSLQTLRDIQRMLF (SEQ ID NO: 21) |
| BCL-22 | YGRKKRRQRRRLSQEQLEHRERSLATLRAIQRMLF (SEQ ID NO: 22) |
| BCL-23 | YGRKKRRQRRRLSQEQLRHREESLETLRRIQEMLF (SEQ ID NO: 23) |
| BCL-24 | YGRKKRRQRRRLSQEQLEHRERALQALRAIQRALF (SEQ ID NO: 24) |
| BCL-25 | YGRKKRRQRRRALQALRAIQRALF (SEQ ID NO: 25) |

ST-BC1 contains a lactam bridge between the bolded, underlined residues. The other five peptides are linear, with a TAT cell-penetrating region, shown in italics. Peptide BCL-21 contains the native HD2 domain, while each of peptides BCL-22-25 has amino acid substitutions in the native BCL9 HD2 domain. In addition to substitutions, peptide BCL-25 also has a shortened HD2 domain relative to the native sequence.

MCF-7 breast cancer cells set at a density of $2.5 \times 10^4$ cells/well in 150 μL of MEM medium+10% fetal bovine serum (FBS) in a 96 well dish. Lyophilized BCL9 peptides were reconstituted at a concentration of 10 mg/mL in 270 mM trehalose buffer and added to each well at a volume of 50 μL to a final concentration range of 2.5-40 μM. Cells were incubated with BCL9 peptides for 96 hours at 37° C.

Cell viability was quantified by spectrophotometry using Roche MTT cell proliferation assay kit according to manufacturer's instructions. Briefly, cells were washed with PBS, and incubated in fresh MEM medium with 10% FBS, 1% penicillin/streptomycin, and 1% non-essential amino acids, plus 10 μL MTT reagent at 37° C. for 4 hours. After 4 hours, 100 μL of solubilization solution was added, and cells were incubated overnight at 37° C. and 5% carbon dioxide. Absorbance was measured at OD570 nm with a reference of OD650 nm. The degree of absorption is proportional to the number of living cells. Percentage of absorbance relative to untreated controls was quantified and presented as % Cell Viability.

Modified BCL9 peptides of the invention, but not BCL-21 having the native BCL9 HD2 domain sequence, demonstrated equal or greater anti-proliferative activity in MCF7 breast cancer cells compared to peptide ST-BC1 ($EC_{50}$ values <10 μM) (FIG. 1). In functional assays, $EC_{50}$ is the concentration that reduces a biological response by 50% of its maximum. In the case of BLC9 peptides, $EC_{50}$ is measured as the concentration that reduces cell viability by 50% of its maximum. $EC_{50}$ can be calculated by any number of means known in the art.

Example 2. Retro Inverso BCL9 Peptides Display Anti-Proliferative Activity in Cancer Cells In Vitro We prepared retro-inverso peptides: BCL-26, with the D-amino acid sequence FLMRQLDRLTQLAKLTPV (SEQ ID NO: 26), and BCL-27, with the D-amino acid sequence WWLARQLARLAQLAKLTPV (SEQ ID NO: 27). A cell-penetrating region derived from Bax-inhibiting peptide is shown in italics. In BCL-26, the sequence of the HD2 domain is shortened by 11 amino acids and substituted at 2 positions relative to the native sequence. In BCL-27, the sequence of the HD2 domain is shortened by 11 amino acids, substituted at 6 positions, and contains an additional N-terminal tryptophan relative to the native sequence.

We examined the cytotoxicity of peptides BCL-26 and BCL-27 using an assay in HL60 promyelocytic leukemia cells. HL60 PML suspension cells were set at a density of $3.5 \times 10^3$ cells/well in 150 μL of RPMI+1.5% fetal bovine serum (FBS) in a 96 well dish. BCL-26 or BCL-27, reconstituted at a concentration of 10 mg/mL in 20 mM His, pH 7.5, was added to each well at a volume of 50 μL to a final concentration range of 0-80 μM. Cells were incubated with peptide for 48 hours at 37° C. Cell viability was quantified by flow cytometry using abcam Annexin V FITC apoptosis detection kit. Briefly, cells were washed with PBS and resuspended in 1× assay buffer containing Annexin V FITC and propidium iodide (PI). Annexin V detects apoptotic cells, and PI stains dead cells. After staining, apoptotic cells show green fluorescence, dead cells show red and green fluorescence, and live cells show little or no fluorescence. Cells were selected for analysis based on forward scatter (FSC) vs. side scatter (SSC), and analyzed by BD Accuri C6 Plus flow cytometer to detect Annexin V-FITC binding (Ex=488 nm; Em=530 nm) using FITC signal detector and PI staining by the phycoerythrnn emission signal detector. Percentage of Annexin $V^{low}$ and $PI^{low}$ were quantified and presented as % Viability. The retro inverso peptides had comparable activity to the standard peptides tested in Example 1 (FIG. 2A-21B).

We examined the cytotoxicity of additional retro inverso and mixed chirality BCL9 mimetic peptides in HL60 cells using the assay described above. Results are shown in Table 9.

TABLE 9

| Peptide | SEQ ID NO | Amino Acid Sequence | $EC_{50}$ |
|---|---|---|---|
| BCL-12 | 12 | [WWIARQLARIAQIA]$_D$ | NA |
| BCL-26 | 26 | [FLMRQLDRLTQIAKLTPV]$_D$ | + |
| BCL-27 | 27 | [WWIARQLARIAQIAKLTPV]$_D$ | ++ |
| BCL-76 | 76 | [WWIARQLERIAQIAKLTPV]$_D$ | + |
| BCL-77 | 77 | [1-Nal-WIARQLARIAQIAKLTPV]$_D$ | +++ |
| BCL-78 | 78 | [2-Nal-WIARQLARIAQIAKLTPV]$_D$ | +++ |
| BCL-79 | 79 | [FWIARQLARIAQIAKLTPV]$_D$ | +++ |
| BCL-80 | 80 | [WWIARQLARLRQIAKLTPV]$_D$ | +++ |
| BCL-81 | 81 | [WFIARQLARIAQIAKLTPV]$_D$ | ++ |
| BCL-82 | 82 | [WLIARQLARIAQIAKLTPV]$_D$ | ++ |
| BCL-83 | 83 | [WWLERQLARIAQIAKLTPV]$_D$ | ++ |
| BCL-84 | 84 | [WWIARQLARIAQIARERGELQEQSLKLTPV]$_D$ | +++ |

TABLE 9-continued

| Peptide | SEQ ID NO | Amino Acid Sequence | EC$_{50}$ |
|---|---|---|---|
| BCL-85 | 85 | [WWIARQLARIQQIAKLTPV]$_D$ | +++ |
| BCL-86 | 86 | [WWIARQLERIARIAKLTPV]$_D$ | +++ |
| BCL-87 | 87 | [PSDGRWWIARQLARIAQIAKLTPV]$_D$ | ++ |
| BCL-88 | 88 | [WWIARQLERIRRIAKLTPV]$_D$ | +++ |
| BCL-89 | 89 | [WWIARQLARIKQIAKLTPV]$_D$ | ++ |
| BCL-90 | 90 | [WWIARQLERIAKIAKLTPV]$_D$ | ++ |
| BCL-91a | 91 | [WWLVRQLARIAQIAKLTPV]$_D$ | +++ |
| BCL-91b | 91 | octanoyl-[WWLVRQLARIAQIAKLTPV]$_D$ | +++ |
| BCL-91c | 91 | isovaleryl-[WWLVRQLARIAQIAKLTPV]$_D$ | +++ |
| BCL-91d | 91 | phenyl-[WWLVRQLARIAQIAKLTPV]$_D$ | +++ |
| BCL-92 | 92 | [PSDGRWWIARQLARIAQIA]$_D$ | ++ |
| BCL-93 | 93 | [WWIARQLARIAQIAPSDGR G]$_D$ | +++ |
| BCL-94 | 94 | naphthyl-[WIARQLARIAQIAKLTPV]$_D$ | +++ |
| BCL-95 | 95 | W$_L$-[WIARQLARIAQIAKLTPV]$_D$ | +++ |
| BCL-96 | 96 | W$_L$-[WIARQLARLAQIAKLTPV]$_D$ | +++ |
| BCL-97 | 97 | W$_L$-[WIARQLERIRRIAKLTPV]$_D$ | +++ |
| BCL-98 | 98 | W$_L$-[WIARQLERIARLAKLTPV]$_D$ | ++ |
| BCL-99 | 99 | F$_L$-[WIARQLARIAQIAKLTPV]$_D$ | ++ |
| BCL-100 | 100 | R$_L$-[WIARQLARIAQIAKLTPV]$_D$ | +++ |
| BCL-101 | 101 | F$_D$-W$_L$-[WIARQLARIAQIAKLTPV]$_D$ | +++ |
| BCL-128 | 128 | [WWLLRQLARIAQIAKLTPV]$_D$ | +++ |
| BCL-129 | 129 | F$_D$-R$_L$-[WIARQLARIAQIAKLTPV]$_D$ | +++ |
| BCL-130 | 130 | F$_D$-R$_L$-[WLVRQLARIAQIAKLTPV]$_D$ | +++ |
| BCL-131 | 131 | F$_D$-W$_L$-[WLVRQLARIAQIAKLTPV]$_D$ | +++ |
| BCL-132 | 132 | F$_D$-W$_L$-[WIARQLARIAALAKLTPV]$_D$ | +++ |
| BCL-133 | 133 | F$_D$-W$_L$-[WIARQLAAIAQIAKLTPV]$_D$ | +++ |
| BCL-134 | 134 | [PSDGRWWIAAQLAAIAQIAKLTPV]$_D$ | NA |
| BCL-135 | 135 | octanoyl-[PSDGRWWIARQLARIAQIAKLTPV]$_D$ | ++ |
| BCL-136a | 136 | octanoyl-[PSDGRWWLVRQLARIAQIAKLTPV]$_D$ | +++ |
| BCL-136b | 136 | phenyl-[PSDGRWWLVRQLARIAQIAKLTPV]$_D$ | ++ |
| BCL-137 | 137 | [PSDGRWWIAOQLAOIAQIAOLTPV]$_D$ | +++ |
| BCL-138 | 138 | octanoyl-[LVRQLARIAQIAKLTPV]$_D$ | NA |
| BCL-139 | 139 | [PSDGRG]$_D$-W$_L$-[WLVRQLARIAQIAKLTPV]$_D$ | +++ |

+++ indicates EC$_{50}$ < 2 µM;
++ indicates EC$_{50}$ = 2-10 µM;
+ indicates EC$_{50}$ > 10 µM;
NA indicates Not Active D and L subscripts denote chirality of the amino acids. Substitutions and additions relative to the retro inverso wild-type BCL9 HD2 sequence (SEQ ID NO: 7) are shown in underlined bold type. The cell-penetrating and RGD-like regions are italicized. As expected, BCL-12 displayed no cytotoxic activity because it lacks a sequence for cell penetration.

Lack of cytotoxic activity by BCL-134 demonstrates the requirement for a positively charged amino acid in at least one of positions 4 or 8 of the HD2 domain, relative to SEQ ID NO: 7. (Compare the activity of BCL-133 with that of BCL-134.)

Lack of cytotoxic activity by BCL-138 demonstrates the requirement that at least one of the two N-terminal amino acids of the HD2 domain is hydrophobic. (Compare the activity of BCL-91b with that of BCL-138.)

Example 3. Retro Inverso BCL9 Peptide Displays Anti-Tumor Activity In Vivo

Figure 3A:
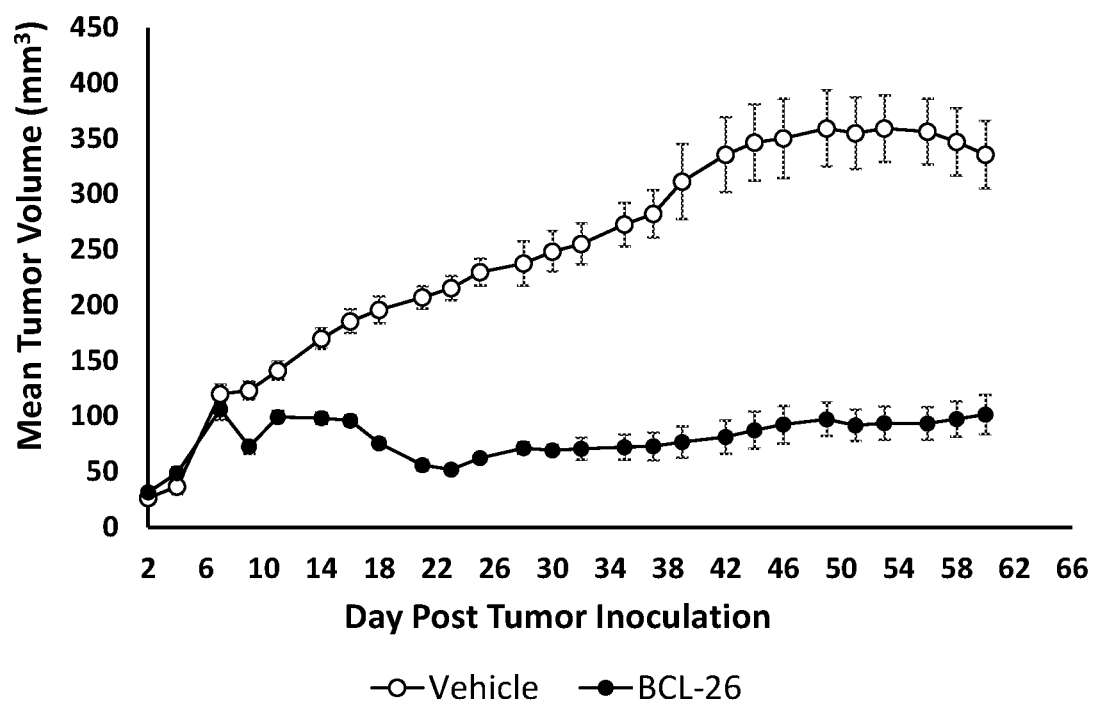
FIG. 3A-3C show that retro inverso BCL9 mimetic peptides of the invention display anti-tumor activity in an MCF7 breast cancer mouse model. Data points represent mean±SEM. BCL-26 (12.5 mg/kg) was administered to nude mice at Day 2 post-tumor inoculation (FIG. 3A; p<0.0001). BCL-87 (5 mg/kg) was administered at Day 21 post-tumor inoculation (FIG. 3B; p<0.005). Two concentrations (1 mg/kg and 5 mg/kg) of BCL-87 and BCL-27 were administered at Day 14 post-tumor inoculation (FIG. 3C; p≤0.0004 versus control for all test peptides).

In this experiment, we examined the effect of peptide BCL-26 on tumor volume in an MCF7 subcutaneous tumor model. Briefly, 2×10$^6$ MCF7 breast cancer cells, suspended 1:1 in Matrigel, were implanted via subcutaneous injection into the axilla of NU/J mice. Peptide BCL-26 was administered at a dose of 12.5 mg/kg via subcutaneous injection three times weekly for three weeks. Dosing was initiated on day 2 post tumor inoculation, with an average starting tumor volume of about 25 mm$^3$. Peptide BCL-26 significantly reduced tumor volume relative to vehicle (FIG. 3A).

Figure 3B:
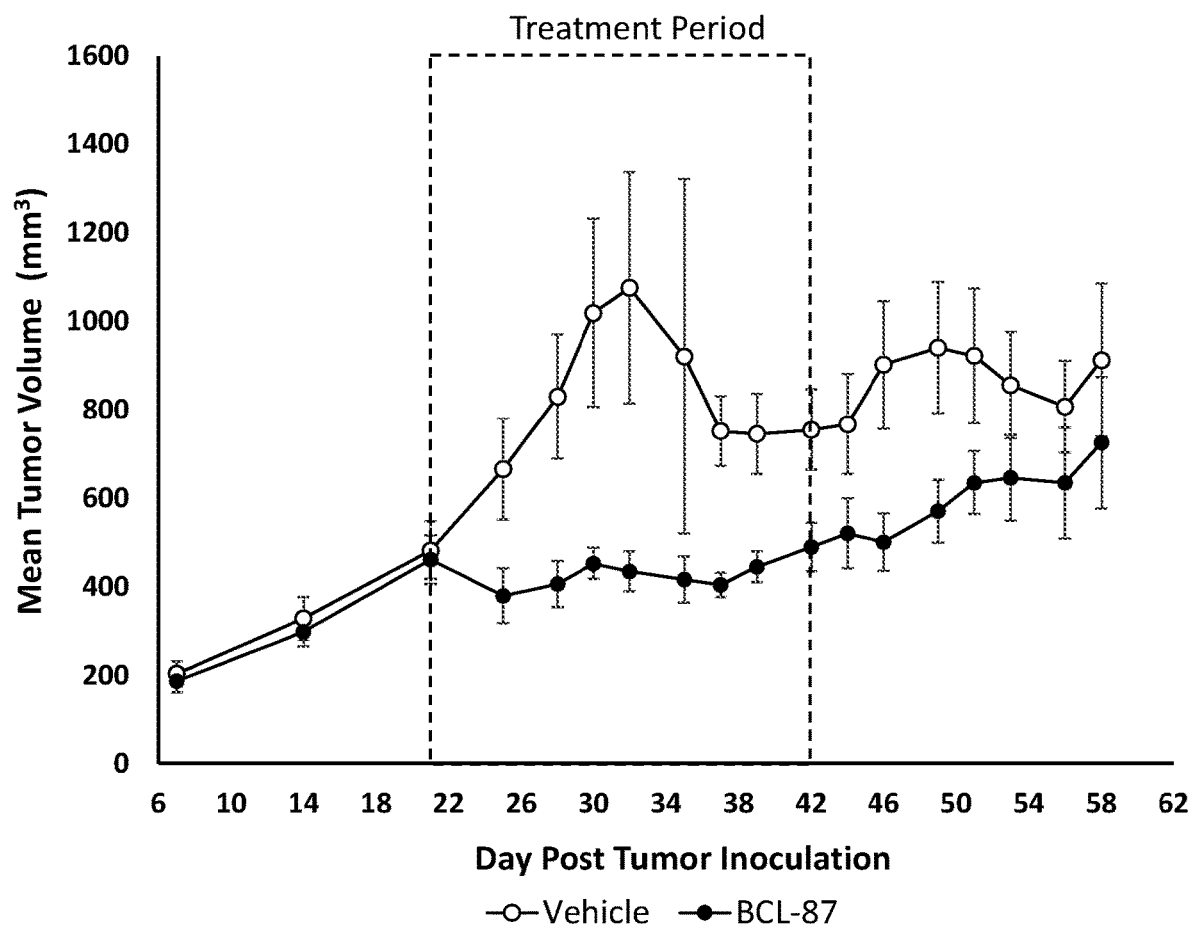

We also examined the effect of BCL9 mimetic peptides in established tumors. MCF7 cells were implanted into mice as described above. Peptide BCL-87 was administered at a dose of 5 mg/kg via subcutaneous injection three times weekly for three weeks. Dosing was initiated on day 21 post tumor inoculation, with an average starting tumor volume of about 470 mm$^3$. Peptide BCL-87 significantly reduced tumor volume relative to vehicle (FIG. 3B).

Figure 3C:
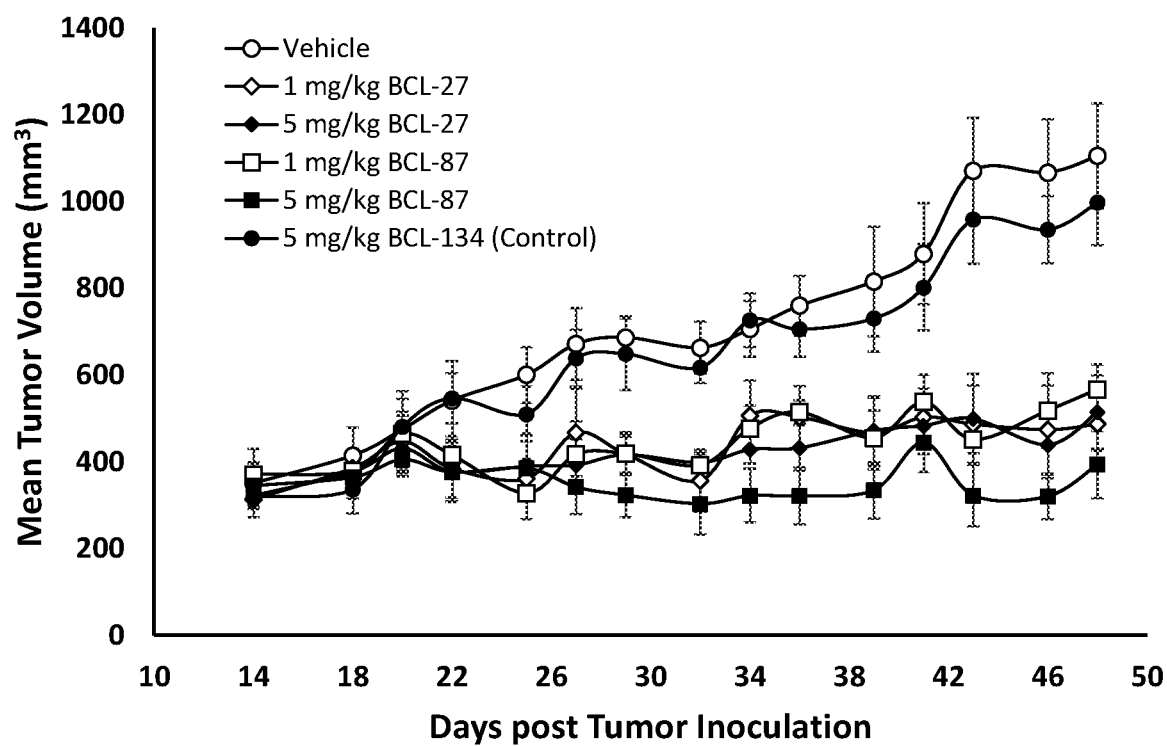

We additionally examined the effect of different concentrations of mimetic peptides in established tumors. MCF7 cells were implanted into mice as described above. Peptides BCL-27 and BCL-87 were administered at a dose of 1 mg/kg or 5 mg/kg via subcutaneous injection three times weekly for three weeks. Dosing was initiated on day 14 post tumor inoculation, with an average starting tumor volume of about 340 mm$^3$. Both peptides significantly reduced tumor volume relative to vehicle and to a peptide control, BCL-134 (FIG. 3C).

REFERENCES

Alves I D, et al. Membrane interaction and perturbation mechanisms induced by two cationic cell penetrating peptides with distinct charge distribution. *Biochim. Biophys. Acta* 1780:948-959 (2008).
Bernal F, et al. Reactivation of the p53 Tumor Suppressor Pathway by a Stapled p53 Peptide. *J. Am. Chem. Soc.* 129:2456-2457 (2007).
Bird G H, et al. Biophysical Determinants for Cellular Uptake of Hydrocarbon-Stapled Peptide Helices. *Nat. Chem. Biol.* 12:845-852 (2017).
Brodsky J L, et al. Translocation of proteins across the endoplasmic reticulum membrane. *Int. Rev. Cyt.* 178:277-328 (1998).
Chaloin L, et al. Conformations of primary amphipathic carrier peptides in membrane mimicking environments. *Biochem.* 36:11179-11187 (1997).
Chaloin L, et al. Design of carrier peptide-oligonucleotide conjugates with rapid membrane translocation and nuclear localization properties. *Biochem. Biophys. Res. Commun.* 243:601-608 (1998).
Cruz J, et al. A membrane-translocating peptide penetrates into bilayers without significant bilayer perturbations. *Biophys. J.* 104:2419-2428 (2013).
Derossi D, et al. Trojan peptides: the penetratin system for intracellular delivery. *Trends Cell Biol.* 8:84-87 (1998).
Elliott G, et al. Intercellular trafficking and protein delivery by a Herpesvirus structural protein. *Cell* 88:223-233 (1997).
Elmquist A, et al. VE-cadherin-derived cell-penetrating peptide, pVEC, with carrier functions. *Exp. Cell Res.* 269:237-244 (2001).
Futaki S, et al. Arginine-rich peptides. An abundant source of membrane-permeable peptides having potential as carriers for intracellular protein delivery. *J. Biol. Chem.* 276:5836-5840 (2001).
Gautam A, et al. CPPsite: a curated database of cell penetrating peptides. *Database* doi:10.1093/database/bas015 (2012).
Hällbrink M, et al. Cargo delivery kinetics of cell-penetrating peptides. *Biochim. Biophys. Acta* 1515:101-109 (2001).
Heitz F, et al. Twenty years of cell-penetrating peptides: from molecular mechanisms to therapeutics. *Brit. J. Pharmacol.* 157:195-206 (2009).
Hervé F, et al. CNS delivery via adsorptive transcytosis. *AAPSJ.* 10:455-472 (2008). Jo, D, et al. Intracellular protein therapy with SOCS3 inhibits inflammation and apoptosis. *Nat. Med.* 11:892-898 (2005).
Kawamoto S A, et al. Analysis of the Interaction of BCL9 with β-Catenin and Development of Fluorescence Polarization and Surface Plasmon Resonance Binding Assays for this Interaction. *Biochem.* 48:9534-9541 (2009).
Kilk K, et al. Cellular internalization of a cargo complex with a novel peptide derived from the third helix of the islet-1 homeodomain. Comparison with the penetratin peptide. *Bioconjug. Chem.* 12:911-916 (2001).
Klein J S, et al. Design and characterization of structured protein linkers with differing flexibilities. *Protein Eng. Des. Sel.* 27:325-330 (2014).
Kosugi S, et al. Six Classes of Nuclear Localization Signals Specific to Different Binding Grooves of Importin α. *J. Biol. Chem.* 284:478-485 (2009).
Krautwald S, et al. Inhibition of regulated cell death by cell-penetrating peptides. *Cell. Mol. Life Sci.* 73:2269-2284 (2016).
Kumar P, et al. Transvascular delivery of small interfering RNA to the central nervous system. *Nature* 448:39-43 (2007).
Kwon S-J, et al. Transduction of the MPG-tagged fusion protein into mammalian cells and oocytes depends on amiloride-sensitive endocytic pathway. *BMC Biotechnol.* 9:73-84 (2009).
Lange A, et al. Classical Nuclear Localization Signals: Definition, Function, and Interaction with Importin α. *J. Biol. Chem.* 282:5101-5105 (2007).
Le Chevalier Isaad A, et al. Side chain-to-side chain cyclization by click reaction. *J. Pept. Sci.* 15:451-454 (2009).
Lindgren M, et al. Cell-penetrating peptides. *Trends Pharmacol. Sci.* 21:99-103 (2000).
Lundberg P, et al. Delivery of short interfering RNA using endosomolytic cell-penetrating peptides. *FASEB J.* 21:2664-2671 (2007).

Magzoub M, et al. Interaction and structure induction of cell-penetrating peptides in the presence of phospholipid vesicles. *Biochim. Biophys. Acta* 1512:77-89 (2001).

Mattaj I W, et al. Nucleocytoplasmic Transport: The Soluble Phase. *Ann. Rev. Biochem.* 67:265-306(1998).

Mitchell D J, et al. Polyarginine enters cells more efficiently than other polycationic homopolymers. *J. Pept. Res.* 56:318-325 (2000).

Morris M C, et al. A new peptide vector for efficient delivery of oligonucleotides into mammalian cells. *Nucleic Acids Res.* 25:2730-2736 (1997).

Morris M C, et al. A peptide carrier for the delivery of biologically active proteins into mammalian cells. *Nat. Biotechnol.* 19:1173-1176 (2001).

Muñoz-Morris M A et al. The peptide carrier Pep-1 forms biologically efficient nanoparticle complexes. *Biochem. Biophys. Res. Commun.* 355:877-882 (2007).

Munyendo W L L, et al. Cell penetrating peptides in the delivery of biopharmaceuticals. *Biomolecules* 2:187-202 (2012).

Oehlke J, et al. Cellular uptake of an alpha-helical amphipathic model peptide with the potential to deliver polar compounds into the cell interior non-endocytically. *Biochim. Biophys. Acta* 1414:127-139 (1998).

Patgiri A, et al. A hydrogen bond surrogate approach for stabilization of short peptide sequences in alpha helical conformation. *Acc. Chem. Res.* 41:1289-1300 (2008).

Pooga M, et al. Cell penetration by transportan. *FASEB J.* 12:67-77 (1998).

Rousselle C, et al. Enhanced delivery of doxorubicin into the brain via a peptide-vector-mediated strategy: saturation kinetics and specificity. *J. Pharmacol. Erp. Ther.* 296:124-131 (2001).

Sampietro J, et al. Crystal Structure of a β-Catenin/BCL9/Tcf4 Complex. *Molec. Cell* 24:293-300 (2006).

Schafmeister C E, et al. An All-Hydrocarbon Cross-Linking System for Enhancing the Helicity and Metabolic Stability of Peptides. *J. Am. Chem. Soc.* 122:5891-5892 (2000).

Scheller A, et al. Structural requirements for cellular uptake of alpha-helical amphipathic peptides. *J. Peptide Sci.* 5:185-194 (1999).

Schmidt M C, et al. Translocation of human calcitonin in respiratory nasal epithelium is associated with self assembly in lipid membrane. *Biochem.* 37:16582-16590 (1998).

Soomets U, et al. Deletion analogues of transportan. *Biochim. Biophys Acta* 1467:165-176 (2000).

Suzuki T, et al. Possible existence of common internalization mechanisms among arginine-rich peptides. *J. Biol. Chem.* 277:2437-2443 (2002).

Takada K, et al. Targeted Disruption of the BCL9/β-catenin Complex Inhibits Oncogenic Wnt Signaling. *Sci. Transl. Med.* 4:148ra117 (2012).

Thorén PEG, et al. The Antennapedia peptide penetratin translocates across lipid bilayers—the first direct observation. *FEBS Lett.* 482:265-68 (2000).

Vivès E, et al. A truncated HIV-1 Tat protein basic domain rapidly translocates through the plasma membrane and accumulates in the cell nucleus. *J. Biol. Chem.* 272:16010-16017 (1997).

Wang X-Y, et al. Synthesis of small cyclic peptides containing the disulfide bond. *ARKIVOC* xi:148-154 (2006).

Wender P A, et al. The design, synthesis, and evaluation of molecules that enable or enhance cellular uptake: peptoid molecular transporters. *Proc. Nal. Acad. Sci. U.S.A.* 97:13003-13008 (2000).

Zhan T, et al. Wnt signaling in cancer. *Oncogene* 36:1461-1473 (2017).

Zhao Y, et al. Chemical engineering of cell penetrating antibodies. *J. Immunol. Methods* 254:137-45 (2001).

Zou L L, et al. Cell-penetrating peptide-mediated therapeutic molecule delivery into the central nervous system. *Curr. Neuropharmacol.* 11:197-208 (2013).

The present invention is further described by the following claims.

The invention claimed is:

1. A B-cell CLL/lymphoma 9 (BCL9) mimetic peptide comprising a modified BCL9 α-helical homology domain-2 (HD2) region, wherein the modified BCL9 HD2 region is a D-amino acid sequence comprising a variant of the D-amino acid sequence FLMRQIDRLTQLS (SEQ ID NO: 7), wherein the variant is SEQ ID NO:7 modified at each position as follows:
   i) F1 is substituted with W;
   ii) M3 is substituted with L;
   iii) I6 is substituted with L;
   iv) D7 is substituted with A;
   v) T10 is substituted with A; and
   vi) S13 is substituted with A;
   and wherein the BCL9 mimetic peptide is capable of promoting cytotoxicity in a neoplastic cell.

2. The BCL9 mimetic peptide according to claim 1, further comprising W, F, R, 1-Nal, or 2-Nal, in either D- or L-form, at position-1 of the modified BCL9 HD2 region.

3. The BCL9 mimetic peptide according to claim 2, further comprising W, F, 1-Nal, or 2-Nal, in either D- or L-form, at position-2 of the modified BCL9 HD2 region.

4. The BCL9 mimetic peptide according to claim 3, comprising R in D-form at position-1 of the modified BCL9 HD2 region and F in D-form at position-2 of the modified BCL9 HD2 region.

5. The BCL9 mimetic peptide according to claim 4, wherein the N-terminus of the peptide is modified with an octanoyl group.

6. The BCL9 mimetic peptide according to claim 1, further comprising a cell-penetrating peptide.

7. The BCL9 mimetic peptide according to claim 6, wherein the cell-penetrating peptide comprises the amino acid sequence YGRKKRRQRRR (SEQ ID NO: 61) or VPTLK (SEQ ID NO: 32), or wherein the cell-penetrating peptide comprises the D-amino acid sequence RRRQRRKKRGY (SEQ ID NO: 73), KLTPV (SEQ ID NO: 74), PSDGRG (SEQ ID NO: 75), or OLTPV (SEQ ID NO: 143).

8. The BCL9 mimetic peptide according to claim 6, wherein the cell-penetrating peptide comprises the D-amino acid sequence KLTPV (SEQ ID NO: 74).

9. The BCL9 mimetic peptide according to claim 1, wherein the N-terminus of the peptide is modified with an acetyl group, a naphthyl group, an octanoyl group, a phenyl group, or an isovaleryl group.

10. The BCL9 mimetic peptide according to claim 1, wherein the C-terminus of the peptide is modified with an amide group.

11. A composition comprising the BCL9 mimetic peptide according to claim 1.

12. The composition according to claim 11, which is a pharmaceutical composition.

13. A kit comprising the BCL9 mimetic peptide according to claim 1.

14. A method of promoting cytotoxicity in a neoplastic cell, the method comprising contacting the neoplastic cell with the BCL9 mimetic peptide according to claim 1.

15. A method of inhibiting proliferation of a neoplastic cell, the method comprising contacting the neoplastic cell with the BCL9 mimetic peptide according to claim 1.

* * * * *

```
SEQUENCE LISTING

<160> NUMBER OF SEQ ID NOS: 144

<210> SEQ ID NO 1
<211> LENGTH: 24
<212> TYPE: PRT
<213> ORGANISM: Homo sapiens

<400> SEQUENCE: 1

Leu Ser Gln Glu Gln Leu Glu His Arg Glu Arg Ser Leu Gln Thr Leu
1               5                   10                  15

Arg Asp Ile Gln Arg Met Leu Phe
            20

<210> SEQ ID NO 2
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Leu Ser Gln Glu Gln Leu Glu His Arg Glu Arg Ser Leu Lys Thr Leu
1               5                   10                  15

Arg Glu Ile Gln Arg Met Leu Phe
            20
```

<210> SEQ ID NO 3
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Leu Ser Gln Glu Gln Leu Glu His Arg Glu Arg Ser Leu Ala Thr Leu
1               5                   10                  15

Arg Ala Ile Gln Arg Met Leu Phe
            20

<210> SEQ ID NO 4
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Leu Ser Gln Glu Gln Leu Arg His Arg Glu Glu Ser Leu Glu Thr Leu
1               5                   10                  15

Arg Arg Ile Gln Glu Met Leu Phe
            20

<210> SEQ ID NO 5
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Leu Ser Gln Glu Gln Leu Glu His Arg Glu Arg Ala Leu Gln Ala Leu
1               5                   10                  15

Arg Ala Ile Gln Arg Ala Leu Phe
            20

<210> SEQ ID NO 6
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Ala Leu Gln Ala Leu Arg Ala Ile Gln Arg Ala Leu Phe
1               5                   10

<210> SEQ ID NO 7
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

```
<400> SEQUENCE: 7

Phe Leu Met Arg Gln Ile Asp Arg Leu Thr Gln Leu Ser
1               5                   10

<210> SEQ ID NO 8
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 8

Phe Leu Met Arg Gln Ile Asp Arg Leu Thr Gln Leu Ala
1               5                   10

<210> SEQ ID NO 9
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 9

Phe Leu Met Arg Gln Leu Asp Arg Leu Thr Gln Leu Ala
1               5                   10

<210> SEQ ID NO 10
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 10

Phe Leu Ala Arg Gln Leu Ala Arg Leu Ala Gln Leu Ala
1               5                   10

<210> SEQ ID NO 11
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 11

Trp Leu Ala Arg Gln Leu Ala Arg Leu Ala Gln Leu Ala
1               5                   10

<210> SEQ ID NO 12
```

```
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 12

Trp Trp Leu Ala Arg Gln Leu Ala Arg Leu Ala Gln Leu Ala
1               5                   10

<210> SEQ ID NO 13
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 13

Phe Leu Met Glu Gln Leu Arg Arg Leu Thr Glu Leu Ala
1               5                   10

<210> SEQ ID NO 14
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 14

Phe Leu Ala Glu Gln Leu Arg Arg Leu Ala Glu Leu Ala
1               5                   10

<210> SEQ ID NO 15
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 15

Trp Leu Ala Glu Gln Leu Arg Arg Leu Ala Glu Leu Ala
1               5                   10

<210> SEQ ID NO 16
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
```

```
<221> NAME/KEY: MOD_RES
<222> LOCATION: (1)..(14)
<223> OTHER INFORMATION: D-amino acid

<400> SEQUENCE: 16

Trp Trp Leu Ala Arg Gln Leu Glu Arg Leu Ala Gln Leu Ala
1               5                   10

<210> SEQ ID NO 17
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: 1-Nal
<220> FEATURE:
<221> NAME/KEY: MOD_RES
<222> LOCATION: (1)..(14)
<223> OTHER INFORMATION: D-amino acid

<400> SEQUENCE: 17

Xaa Trp Leu Ala Arg Gln Leu Ala Arg Leu Arg Gln Leu Ala
1               5                   10

<210> SEQ ID NO 18
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 18

Phe Leu Leu Arg Gln Ile Asp Arg Leu Thr Gln Leu Ala
1               5                   10

<210> SEQ ID NO 19
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid

<400> SEQUENCE: 19

Phe Leu Leu Arg Gln Leu Asp Arg Leu Thr Gln Leu Ala
1               5                   10

<210> SEQ ID NO 20
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid
```

```
<400> SEQUENCE: 20

Phe Leu Leu Arg Gln Leu Glu Arg Leu Thr Gln Leu Ala
1               5                   10

<210> SEQ ID NO 21
<211> LENGTH: 35
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Tyr Gly Arg Lys Lys Arg Arg Gln Arg Arg Leu Ser Gln Glu Gln
1               5                   10                  15

Leu Glu His Arg Glu Arg Ser Leu Gln Thr Leu Arg Asp Ile Gln Arg
            20                  25                  30

Met Leu Phe
        35

<210> SEQ ID NO 22
<211> LENGTH: 35
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

Tyr Gly Arg Lys Lys Arg Arg Gln Arg Arg Leu Ser Gln Glu Gln
1               5                   10                  15

Leu Glu His Arg Glu Arg Ser Leu Ala Thr Leu Arg Ala Ile Gln Arg
            20                  25                  30

Met Leu Phe
        35

<210> SEQ ID NO 23
<211> LENGTH: 35
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 23

Tyr Gly Arg Lys Lys Arg Arg Gln Arg Arg Leu Ser Gln Glu Gln
1               5                   10                  15

Leu Arg His Arg Glu Glu Ser Leu Glu Thr Leu Arg Arg Ile Gln Glu
            20                  25                  30

Met Leu Phe
        35

<210> SEQ ID NO 24
<211> LENGTH: 35
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 24

Tyr Gly Arg Lys Lys Arg Arg Gln Arg Arg Leu Ser Gln Glu Gln
1               5                   10                  15
```

```
Leu Glu His Arg Glu Arg Ala Leu Gln Ala Leu Arg Ala Ile Gln Arg
            20                  25                  30

Ala Leu Phe
        35

<210> SEQ ID NO 25
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Tyr Gly Arg Lys Lys Arg Arg Gln Arg Arg Ala Leu Gln Ala Leu
1               5                   10                  15

Arg Ala Ile Gln Arg Ala Leu Phe
            20

<210> SEQ ID NO 26
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(18)
<223> OTHER INFORMATION: D-amino acid

<400> SEQUENCE: 26

Phe Leu Met Arg Gln Leu Asp Arg Leu Thr Gln Leu Ala Lys Leu Thr
1               5                   10                  15

Pro Val

<210> SEQ ID NO 27
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 27

Trp Trp Leu Ala Arg Gln Leu Ala Arg Leu Ala Gln Leu Ala Lys Leu
1               5                   10                  15

Thr Pro Val

<210> SEQ ID NO 28
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 28

Gly Arg Gly Asp Ser
1               5
```

```
<210> SEQ ID NO 29
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 29

Gly Arg Gly Asp Asn Pro
1               5

<210> SEQ ID NO 30
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
<223> OTHER INFORMATION: Lys or Arg
<220> FEATURE:
<221> NAME/KEY: MOD_RES
<222> LOCATION: (3)..(3)
<223> OTHER INFORMATION: Any amino acid
<220> FEATURE:
<221> NAME/KEY: MOD_RES
<222> LOCATION: (4)..(4)
<223> OTHER INFORMATION: Lys or Arg

<400> SEQUENCE: 30

Lys Xaa Xaa Xaa
1

<210> SEQ ID NO 31
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(2)
<223> OTHER INFORMATION: Lys or Arg
<220> FEATURE:
<221> NAME/KEY: MOD_RES
<222> LOCATION: (3)..(14)
<223> OTHER INFORMATION: Any amino acid
<220> FEATURE:
<221> NAME/KEY: MISC_FEATURE
<222> LOCATION: (3)..(14)
<223> OTHER INFORMATION: This region may encompass 10-12 residues
<220> FEATURE:
<221> NAME/KEY: MOD_RES
<222> LOCATION: (15)..(19)
<223> OTHER INFORMATION: Any amino acid, wherein at least 3 of the 5
      consecutive amino acids in this region are Lys or Arg

<400> SEQUENCE: 31

Xaa Xaa Xaa Xaa Xaa Xaa Xaa Xaa Xaa Xaa Xaa Xaa Xaa Xaa Xaa Xaa
1               5                   10                  15

Xaa Xaa Xaa

<210> SEQ ID NO 32
<211> LENGTH: 5
<212> TYPE: PRT
<213> ORGANISM: Unknown
<220> FEATURE:
<223> OTHER INFORMATION: Description of Unknown:
```

Bax-inhibiting peptide NLS1 sequence

<400> SEQUENCE: 32

Val Pro Thr Leu Lys
1               5

<210> SEQ ID NO 33
<211> LENGTH: 5
<212> TYPE: PRT
<213> ORGANISM: Unknown
<220> FEATURE:
<223> OTHER INFORMATION: Description of Unknown:
      Bax-inhibiting peptide NLS2 sequence

<400> SEQUENCE: 33

Lys Leu Pro Val Met
1               5

<210> SEQ ID NO 34
<211> LENGTH: 9
<212> TYPE: PRT
<213> ORGANISM: Unknown
<220> FEATURE:
<223> OTHER INFORMATION: Description of Unknown:
      c-Myc NLS sequence

<400> SEQUENCE: 34

Pro Ala Ala Lys Arg Val Lys Leu Asp
1               5

<210> SEQ ID NO 35
<211> LENGTH: 7
<212> TYPE: PRT
<213> ORGANISM: Caenorhabditis elegans

<400> SEQUENCE: 35

Phe Lys Lys Phe Arg Lys Phe
1               5

<210> SEQ ID NO 36
<211> LENGTH: 23
<212> TYPE: PRT
<213> ORGANISM: Unknown
<220> FEATURE:
<223> OTHER INFORMATION: Description of Unknown:
      EB1 CPP sequence

<400> SEQUENCE: 36

Leu Ile Arg Leu Trp Ser His Leu Ile His Ile Trp Phe Gln Asn Arg
1               5                   10                  15

Arg Leu Lys Trp Lys Lys Lys
            20

<210> SEQ ID NO 37
<211> LENGTH: 27
<212> TYPE: PRT
<213> ORGANISM: Unknown
<220> FEATURE:
<223> OTHER INFORMATION: Description of Unknown:
      FBP CPP sequence

<400> SEQUENCE: 37

Gly Ala Leu Phe Leu Gly Trp Leu Gly Ala Ala Gly Ser Thr Met Gly
1               5                   10                  15

Ala Trp Ser Gln Pro Lys Lys Lys Arg Lys Val
            20                  25

```
<210> SEQ ID NO 38
<211> LENGTH: 16
<212> TYPE: PRT
<213> ORGANISM: Unknown
<220> FEATURE:
<223> OTHER INFORMATION: Description of Unknown:
      FGF4 CPP sequence

<400> SEQUENCE: 38

Ala Ala Val Ala Leu Leu Pro Ala Val Leu Leu Ala Leu Leu Ala Pro
1               5                   10                  15

<210> SEQ ID NO 39
<211> LENGTH: 8
<212> TYPE: PRT
<213> ORGANISM: Unknown
<220> FEATURE:
<223> OTHER INFORMATION: Description of Unknown:
      HATF3 sequence

<400> SEQUENCE: 39

Glu Arg Lys Lys Arg Arg Arg Glu
1               5

<210> SEQ ID NO 40
<211> LENGTH: 22
<212> TYPE: PRT
<213> ORGANISM: Homo sapiens

<400> SEQUENCE: 40

Leu Gly Thr Tyr Thr Gln Asp Phe Asn Lys Thr Phe Pro Gln Thr Ala
1               5                   10                  15

Ile Gly Val Gly Ala Pro
            20

<210> SEQ ID NO 41
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 41

Lys Leu Ala Leu Lys Leu Ala Leu Lys Ala Leu Lys Ala Ala Leu Lys
1               5                   10                  15

Leu Ala

<210> SEQ ID NO 42
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 42

Gly Leu Ala Phe Leu Gly Phe Leu Gly Ala Ala Gly Ser Thr Met Gly
1               5                   10                  15

Ala Trp Ser Gln Pro Lys Lys Lys Arg Lys Val
            20                  25

<210> SEQ ID NO 43
<211> LENGTH: 10
```

```
<212> TYPE: PRT
<213> ORGANISM: Unknown
<220> FEATURE:
<223> OTHER INFORMATION: Description of Unknown:
      Nuclear factor kappa B sequence

<400> SEQUENCE: 43

Val Gln Arg Lys Arg Gln Lys Leu Met Pro
1               5                   10

<210> SEQ ID NO 44
<211> LENGTH: 15
<212> TYPE: PRT
<213> ORGANISM: Unknown
<220> FEATURE:
<223> OTHER INFORMATION: Description of Unknown:
      Nucleoplasmin sequence

<400> SEQUENCE: 44

Lys Arg Pro Ala Ala Thr Lys Lys Ala Gly Gln Ala Lys Lys Lys
1               5                   10                  15

<210> SEQ ID NO 45
<211> LENGTH: 8
<212> TYPE: PRT
<213> ORGANISM: Unknown
<220> FEATURE:
<223> OTHER INFORMATION: Description of Unknown:
      OCT-6 sequence

<400> SEQUENCE: 45

Gly Arg Lys Arg Lys Lys Arg Thr
1               5

<210> SEQ ID NO 46
<211> LENGTH: 16
<212> TYPE: PRT
<213> ORGANISM: Drosophila sp.

<400> SEQUENCE: 46

Arg Gln Ile Lys Ile Trp Phe Gln Asn Arg Arg Met Lys Trp Lys Lys
1               5                   10                  15

<210> SEQ ID NO 47
<211> LENGTH: 16
<212> TYPE: PRT
<213> ORGANISM: Drosophila sp.

<400> SEQUENCE: 47

Arg Gln Leu Lys Leu Trp Phe Gln Asn Arg Arg Met Lys Trp Lys Lys
1               5                   10                  15

<210> SEQ ID NO 48
<211> LENGTH: 16
<212> TYPE: PRT
<213> ORGANISM: Drosophila sp.

<400> SEQUENCE: 48

Arg Glu Ile Lys Ile Trp Phe Gln Asn Arg Arg Met Lys Trp Lys Lys
1               5                   10                  15

<210> SEQ ID NO 49
<211> LENGTH: 20
<212> TYPE: PRT
<213> ORGANISM: Artificial Sequence
<220> FEATURE:
<223> OTHER INFORMATION: Description of Artificial Sequence: Synthetic
```

```
                            peptide

<400> SEQUENCE: 49

Lys Glu Thr Trp Trp Glu Thr Trp Trp Thr Glu Trp Ser Gln Pro Lys
1               5                   10                  15

Lys Arg Lys Val
            20

<210> SEQ ID NO 50
<211> LENGTH: 16
<212> TYPE: PRT
<213> ORGANISM: Rattus sp.

<400> SEQUENCE: 50

Pro Val Ile Arg Val Trp Phe Gln Asn Lys Arg Cys Lys Asp Lys Lys
1               5                   10                  15

<210> SEQ ID NO 51
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (7)..(12)
<223> OTHER INFORMATION: This region may encompass 1-6 residues

<400> SEQUENCE: 51

Arg Arg Arg Arg Arg Arg Arg Arg Arg Arg Arg Arg
1               5                   10

<210> SEQ ID NO 52
<211> LENGTH: 16
<212> TYPE: PRT
<213> ORGANISM: Mus sp.

<400> SEQUENCE: 52

Leu Leu Ile Ile Leu Arg Arg Arg Ile Arg Lys Gln Ala His Ala His
1               5                   10                  15

<210> SEQ ID NO 53
<211> LENGTH: 16
<212> TYPE: PRT
<213> ORGANISM: Unknown
<220> FEATURE:
<223> OTHER INFORMATION: Description of Unknown:
      RL-16 CPP sequence

<400> SEQUENCE: 53

Arg Arg Leu Arg Arg Leu Leu Arg Arg Leu Leu Arg Arg Leu Arg Arg
1               5                   10                  15

<210> SEQ ID NO 54
<211> LENGTH: 12
<212> TYPE: PRT
<213> ORGANISM: Rabies virus

<400> SEQUENCE: 54

Arg Val Gly Arg Arg Arg Arg Arg Arg Arg Arg Arg
1               5                   10

<210> SEQ ID NO 55
<211> LENGTH: 9
<212> TYPE: PRT
```

```
<213> ORGANISM: Artificial Sequence
<220> FEATURE:
<223> OTHER INFORMATION: Description of Artificial Sequence: Synthetic
      peptide

<400> SEQUENCE: 55

Arg Arg Trp Trp Arg Arg Trp Arg Arg
1               5

<210> SEQ ID NO 56
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Met Gly Leu Gly Leu His Leu Leu Val Leu Ala Ala Ala Leu Gln Gly
1               5                   10                  15

Ala Trp Ser Gln Pro Lys Lys Lys Arg Lys Val
            20                  25

<210> SEQ ID NO 57
<211> LENGTH: 7
<212> TYPE: PRT
<213> ORGANISM: Simian virus 40

<400> SEQUENCE: 57

Pro Lys Lys Lys Arg Lys Val
1               5

<210> SEQ ID NO 58
<211> LENGTH: 17
<212> TYPE: PRT
<213> ORGANISM: Unknown
<220> FEATURE:
<223> OTHER INFORMATION: Description of Unknown:
      SynB1 CPP sequence

<400> SEQUENCE: 58

Arg Gly Gly Arg Leu Ser Tyr Ser Arg Arg Phe Ser Thr Ser Thr Gly
1               5                   10                  15

Arg

<210> SEQ ID NO 59
<211> LENGTH: 10
<212> TYPE: PRT
<213> ORGANISM: Unknown
<220> FEATURE:
<223> OTHER INFORMATION: Description of Unknown:
      SynB3 CPP sequence

<400> SEQUENCE: 59

Arg Arg Leu Ser Tyr Ser Arg Arg Arg Phe
1               5                   10

<210> SEQ ID NO 60
<211> LENGTH: 17
<212> TYPE: PRT
<213> ORGANISM: Unknown
<220> FEATURE:
<223> OTHER INFORMATION: Description of Unknown:
      SynB5 CPP sequence

<400> SEQUENCE: 60
```

```
Arg Gly Gly Arg Leu Ala Tyr Leu Arg Arg Arg Trp Ala Val Leu Gly
1               5                   10                  15
Arg

<210> SEQ ID NO 61
<211> LENGTH: 11
<212> TYPE: PRT
<213> ORGANISM: Human immunodeficiency virus 1

<400> SEQUENCE: 61

Tyr Gly Arg Lys Lys Arg Arg Gln Arg Arg Arg
1               5                   10

<210> SEQ ID NO 62
<211> LENGTH: 10
<212> TYPE: PRT
<213> ORGANISM: Human immunodeficiency virus 1

<400> SEQUENCE: 62

Tyr Gly Arg Lys Lys Arg Arg Gln Arg Arg
1               5                   10

<210> SEQ ID NO 63
<211> LENGTH: 9
<212> TYPE: PRT
<213> ORGANISM: Human immunodeficiency virus 1

<400> SEQUENCE: 63

Gly Arg Lys Lys Arg Arg Gln Arg Arg
1               5

<210> SEQ ID NO 64
<211> LENGTH: 13
<212> TYPE: PRT
<213> ORGANISM: Human immunodeficiency virus 1

<400> SEQUENCE: 64

Gly Arg Lys Lys Arg Arg Gln Arg Arg Arg Pro Pro Gln
1               5                   10

<210> SEQ ID NO 65
<211> LENGTH: 11
<212> TYPE: PRT
<213> ORGANISM: Unknown
<220> FEATURE:
<223> OTHER INFORMATION: Description of Unknown:
      TCF1-alpha sequence

<400> SEQUENCE: 65

Gly Lys Lys Lys Lys Arg Lys Arg Glu Lys Leu
1               5                   10

<210> SEQ ID NO 66
<211> LENGTH: 8
<212> TYPE: PRT
<213> ORGANISM: Unknown
<220> FEATURE:
<223> OTHER INFORMATION: Description of Unknown:
      TFIIE-beta sequence

<400> SEQUENCE: 66

Ser Lys Lys Lys Lys Thr Lys Val
1               5

<210> SEQ ID NO 67
```

```
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 67

Gly Trp Thr Leu Asn Ser Ala Gly Tyr Leu Leu Gly Lys Ile Asn Leu
1               5                   10                  15

Lys Ala Leu Ala Ala Leu Ala Lys Lys Ile Leu
            20                  25

<210> SEQ ID NO 68
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 68

Ala Gly Tyr Leu Leu Gly Lys Ile Asn Leu Lys Ala Leu Ala Ala Leu
1               5                   10                  15

Ala Lys Lys Ile Leu
            20

<210> SEQ ID NO 69
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 69

Pro Leu Ile Tyr Leu Arg Leu Leu Arg Gly Gln Phe
1               5                   10

<210> SEQ ID NO 70
<211> LENGTH: 34
<212> TYPE: PRT
<213> ORGANISM: Herpes simplex virus

<400> SEQUENCE: 70

Asp Ala Ala Thr Ala Thr Arg Gly Arg Ser Ala Ala Ser Arg Pro Thr
1               5                   10                  15

Gln Arg Pro Arg Ala Pro Ala Arg Ser Ala Ser Arg Pro Arg Arg Pro
            20                  25                  30

Val Gln

<210> SEQ ID NO 71
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(16)
<223> OTHER INFORMATION: D-amino acid

<400> SEQUENCE: 71

Lys Lys Trp Lys Met Arg Arg Asn Gln Phe Trp Ile Lys Ile Gln Arg
1               5                   10                  15
```

```
<210> SEQ ID NO 72
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(16)
<223> OTHER INFORMATION: D-amino acid

<400> SEQUENCE: 72

Lys Lys Trp Lys Met Arg Arg Asn Gln Phe Trp Leu Lys Leu Gln Arg
1               5                   10                  15

<210> SEQ ID NO 73
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(11)
<223> OTHER INFORMATION: D-amino acid

<400> SEQUENCE: 73

Arg Arg Arg Gln Arg Arg Lys Lys Arg Gly Tyr
1               5                   10

<210> SEQ ID NO 74
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(5)
<223> OTHER INFORMATION: D-amino acid

<400> SEQUENCE: 74

Lys Leu Thr Pro Val
1               5

<210> SEQ ID NO 75
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(6)
<223> OTHER INFORMATION: D-amino acid

<400> SEQUENCE: 75

Pro Ser Asp Gly Arg Gly
1               5

<210> SEQ ID NO 76
<211> LENGTH: 19
<212> TYPE: PRT
<213> ORGANISM: Artificial Sequence
<220> FEATURE:
```

```
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 76

Trp Trp Leu Ala Arg Gln Leu Glu Arg Leu Ala Gln Leu Ala Lys Leu
1               5                   10                  15

Thr Pro Val

<210> SEQ ID NO 77
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: 1-Nal
<220> FEATURE:
<221> NAME/KEY: MOD_RES
<222> LOCATION: (1)..(19)
<223> OTHER INFORMATION: D-amino acid

<400> SEQUENCE: 77

Xaa Trp Leu Ala Arg Gln Leu Ala Arg Leu Ala Gln Leu Ala Lys Leu
1               5                   10                  15

Thr Pro Val

<210> SEQ ID NO 78
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: 2-Nal
<220> FEATURE:
<221> NAME/KEY: MOD_RES
<222> LOCATION: (1)..(19)
<223> OTHER INFORMATION: D-amino acid

<400> SEQUENCE: 78

Xaa Trp Leu Ala Arg Gln Leu Ala Arg Leu Ala Gln Leu Ala Lys Leu
1               5                   10                  15

Thr Pro Val

<210> SEQ ID NO 79
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 79

Phe Trp Leu Ala Arg Gln Leu Ala Arg Leu Ala Gln Leu Ala Lys Leu
1               5                   10                  15
```

Thr Pro Val

<210> SEQ ID NO 80
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 80

Trp Trp Leu Ala Arg Gln Leu Ala Arg Leu Arg Gln Leu Ala Lys Leu
1               5                   10                  15

Thr Pro Val

<210> SEQ ID NO 81
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 81

Trp Phe Leu Ala Arg Gln Leu Ala Arg Leu Ala Gln Leu Ala Lys Leu
1               5                   10                  15

Thr Pro Val

<210> SEQ ID NO 82
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 82

Trp Leu Leu Ala Arg Gln Leu Ala Arg Leu Ala Gln Leu Ala Lys Leu
1               5                   10                  15

Thr Pro Val

<210> SEQ ID NO 83
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 83

Trp Trp Leu Glu Arg Gln Leu Ala Arg Leu Ala Gln Leu Ala Lys Leu

```
<210> SEQ ID NO 84
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (1)..(30)
<223> OTHER INFORMATION: D-amino acid

<400> SEQUENCE: 84

Trp Trp Leu Ala Arg Gln Leu Ala Arg Leu Ala Gln Leu Ala Arg Glu
1               5                   10                  15

Arg His Glu Leu Gln Glu Gln Ser Leu Lys Leu Thr Pro Val
            20                  25                  30

<210> SEQ ID NO 85
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 85

Trp Trp Leu Ala Arg Gln Leu Ala Arg Leu Gln Gln Leu Ala Lys Leu
1               5                   10                  15

Thr Pro Val

<210> SEQ ID NO 86
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 86

Trp Trp Leu Ala Arg Gln Leu Glu Arg Leu Ala Arg Leu Ala Lys Leu
1               5                   10                  15

Thr Pro Val

<210> SEQ ID NO 87
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(25)
<223> OTHER INFORMATION: D-amino acid

<400> SEQUENCE: 87
```

-continued

```
Pro Ser Asp Gly Arg Gly Trp Trp Leu Ala Arg Gln Leu Ala Arg Leu
1               5                   10                  15

Ala Gln Leu Ala Lys Leu Thr Pro Val
            20                  25

<210> SEQ ID NO 88
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 88

Trp Trp Leu Ala Arg Gln Leu Glu Arg Leu Arg Arg Leu Ala Lys Leu
1               5                   10                  15

Thr Pro Val

<210> SEQ ID NO 89
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 89

Trp Trp Leu Ala Arg Gln Leu Ala Arg Leu Lys Gln Leu Ala Lys Leu
1               5                   10                  15

Thr Pro Val

<210> SEQ ID NO 90
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 90

Trp Trp Leu Ala Arg Gln Leu Glu Arg Leu Ala Lys Leu Ala Lys Leu
1               5                   10                  15

Thr Pro Val

<210> SEQ ID NO 91
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid
```

-continued

```
<400> SEQUENCE: 91

Trp Trp Leu Val Arg Gln Leu Ala Arg Leu Ala Gln Leu Ala Lys Leu
1               5                   10                  15

Thr Pro Val

<210> SEQ ID NO 92
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(20)
<223> OTHER INFORMATION: D-amino acid

<400> SEQUENCE: 92

Pro Ser Asp Gly Arg Gly Trp Trp Leu Ala Arg Gln Leu Ala Arg Leu
1               5                   10                  15

Ala Gln Leu Ala
            20

<210> SEQ ID NO 93
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(20)
<223> OTHER INFORMATION: D-amino acid

<400> SEQUENCE: 93

Trp Trp Leu Ala Arg Gln Leu Ala Arg Leu Ala Gln Leu Ala Pro Ser
1               5                   10                  15

Asp Gly Arg Gly
            20

<210> SEQ ID NO 94
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(18)
<223> OTHER INFORMATION: D-amino acid

<400> SEQUENCE: 94

Trp Leu Ala Arg Gln Leu Ala Arg Leu Ala Gln Leu Ala Lys Leu Thr
1               5                   10                  15

Pro Val

<210> SEQ ID NO 95
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
```

```
<221> NAME/KEY: MOD_RES
<222> LOCATION: (2)..(19)
<223> OTHER INFORMATION: D-amino acid

<400> SEQUENCE: 95

Trp Trp Leu Ala Arg Gln Leu Ala Arg Leu Ala Gln Leu Ala Lys Leu
1               5                   10                  15

Thr Pro Val

<210> SEQ ID NO 96
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(19)
<223> OTHER INFORMATION: D-amino acid

<400> SEQUENCE: 96

Trp Trp Leu Ala Arg Gln Leu Ala Arg Leu Arg Gln Leu Ala Lys Leu
1               5                   10                  15

Thr Pro Val

<210> SEQ ID NO 97
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(19)
<223> OTHER INFORMATION: D-amino acid

<400> SEQUENCE: 97

Trp Trp Leu Ala Arg Gln Leu Glu Arg Leu Arg Arg Leu Ala Lys Leu
1               5                   10                  15

Thr Pro Val

<210> SEQ ID NO 98
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(19)
<223> OTHER INFORMATION: D-amino acid

<400> SEQUENCE: 98

Trp Trp Leu Ala Arg Gln Leu Glu Arg Leu Ala Arg Leu Ala Lys Leu
1               5                   10                  15

Thr Pro Val

<210> SEQ ID NO 99
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
```

```
<220> FEATURE:
<221> NAME/KEY: MOD_RES
<222> LOCATION: (2)..(19)
<223> OTHER INFORMATION: D-amino acid

<400> SEQUENCE: 99

Phe Trp Leu Ala Arg Gln Leu Ala Arg Leu Ala Gln Leu Ala Lys Leu
1               5                   10                  15

Thr Pro Val

<210> SEQ ID NO 100
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(19)
<223> OTHER INFORMATION: D-amino acid

<400> SEQUENCE: 100

Arg Trp Leu Ala Arg Gln Leu Ala Arg Leu Ala Gln Leu Ala Lys Leu
1               5                   10                  15

Thr Pro Val

<210> SEQ ID NO 101
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(20)
<223> OTHER INFORMATION: D-amino acid

<400> SEQUENCE: 101

Phe Trp Trp Leu Ala Arg Gln Leu Ala Arg Leu Ala Gln Leu Ala Lys
1               5                   10                  15

Leu Thr Pro Val
            20

<210> SEQ ID NO 102
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 102

Trp Trp Leu Leu Arg Gln Leu Ala Arg Leu Ala Gln Leu Ala
1               5                   10

<210> SEQ ID NO 103
<211> LENGTH: 15
<212> TYPE: PRT
```

```
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(15)
<223> OTHER INFORMATION: D-amino acid

<400> SEQUENCE: 103

Phe Arg Trp Leu Ala Arg Gln Leu Ala Arg Leu Ala Gln Leu Ala
1               5                   10                  15

<210> SEQ ID NO 104
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(15)
<223> OTHER INFORMATION: D-amino acid

<400> SEQUENCE: 104

Phe Arg Trp Leu Val Arg Gln Leu Ala Arg Leu Ala Gln Leu Ala
1               5                   10                  15

<210> SEQ ID NO 105
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(15)
<223> OTHER INFORMATION: D-amino acid

<400> SEQUENCE: 105

Phe Trp Trp Leu Val Arg Gln Leu Ala Arg Leu Ala Gln Leu Ala
1               5                   10                  15

<210> SEQ ID NO 106
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(15)
<223> OTHER INFORMATION: D-amino acid
```

```
<400> SEQUENCE: 106

Phe Trp Trp Leu Ala Arg Gln Leu Ala Arg Leu Ala Ala Leu Ala
1               5                   10                  15

<210> SEQ ID NO 107
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(15)
<223> OTHER INFORMATION: D-amino acid

<400> SEQUENCE: 107

Phe Trp Trp Leu Ala Arg Gln Leu Ala Ala Leu Ala Gln Leu Ala
1               5                   10                  15

<210> SEQ ID NO 108
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 108

Trp Trp Leu Ala Arg Gln Leu Ala Arg Leu Ala Gln Leu Ala
1               5                   10

<210> SEQ ID NO 109
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 109

Trp Trp Leu Ala Arg Gln Leu Ala Arg Leu Arg Gln Leu Ala
1               5                   10

<210> SEQ ID NO 110
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 110

Trp Trp Leu Ala Arg Gln Leu Glu Arg Leu Arg Arg Leu Ala
```

```
1               5                   10
```

<210> SEQ ID NO 111
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 111

```
Trp Trp Leu Ala Arg Gln Leu Glu Arg Leu Ala Arg Leu Ala
1               5                   10
```

<210> SEQ ID NO 112
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 112

```
Phe Trp Leu Ala Arg Gln Leu Ala Arg Leu Ala Gln Leu Ala
1               5                   10
```

<210> SEQ ID NO 113
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 113

```
Arg Trp Leu Ala Arg Gln Leu Ala Arg Leu Ala Gln Leu Ala
1               5                   10
```

<210> SEQ ID NO 114
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(15)
<223> OTHER INFORMATION: D-amino acid

<400> SEQUENCE: 114

```
Phe Trp Trp Leu Ala Arg Gln Leu Ala Arg Leu Ala Gln Leu Ala
1               5                   10                  15
```

```
<210> SEQ ID NO 115
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: 2-Nal
<220> FEATURE:
<221> NAME/KEY: MOD_RES
<222> LOCATION: (1)..(14)
<223> OTHER INFORMATION: D-amino acid

<400> SEQUENCE: 115

Xaa Trp Leu Ala Arg Gln Leu Ala Arg Leu Ala Gln Leu Ala
1               5                   10

<210> SEQ ID NO 116
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 116

Phe Trp Leu Ala Arg Gln Leu Ala Arg Leu Ala Gln Leu Ala
1               5                   10

<210> SEQ ID NO 117
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 117

Trp Trp Leu Ala Arg Gln Leu Ala Arg Leu Arg Gln Leu Ala
1               5                   10

<210> SEQ ID NO 118
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 118

Trp Phe Leu Ala Arg Gln Leu Ala Arg Leu Ala Gln Leu Ala
1               5                   10

<210> SEQ ID NO 119
<211> LENGTH: 14
<212> TYPE: PRT
```

```
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 119

Trp Leu Leu Ala Arg Gln Leu Ala Arg Leu Ala Gln Leu Ala
1               5                   10

<210> SEQ ID NO 120
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 120

Trp Trp Leu Glu Arg Gln Leu Ala Arg Leu Ala Gln Leu Ala
1               5                   10

<210> SEQ ID NO 121
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(25)
<223> OTHER INFORMATION: D-amino acid

<400> SEQUENCE: 121

Trp Trp Leu Ala Arg Gln Leu Ala Arg Leu Ala Gln Leu Ala Arg Glu
1               5                   10                  15

Arg His Glu Leu Gln Glu Gln Ser Leu
            20                  25

<210> SEQ ID NO 122
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 122

Trp Trp Leu Ala Arg Gln Leu Ala Arg Leu Gln Gln Leu Ala
1               5                   10

<210> SEQ ID NO 123
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
```

```
<220> FEATURE:
<221> NAME/KEY: MOD_RES
<222> LOCATION: (1)..(14)
<223> OTHER INFORMATION: D-amino acid

<400> SEQUENCE: 123

Trp Trp Leu Ala Arg Gln Leu Glu Arg Leu Ala Arg Leu Ala
1               5                   10

<210> SEQ ID NO 124
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 124

Trp Trp Leu Ala Arg Gln Leu Glu Arg Leu Arg Arg Leu Ala
1               5                   10

<210> SEQ ID NO 125
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 125

Trp Trp Leu Ala Arg Gln Leu Ala Arg Leu Lys Gln Leu Ala
1               5                   10

<210> SEQ ID NO 126
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 126

Trp Trp Leu Ala Arg Gln Leu Glu Arg Leu Ala Lys Leu Ala
1               5                   10

<210> SEQ ID NO 127
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid

<400> SEQUENCE: 127
```

```
Trp Trp Leu Val Arg Gln Leu Ala Arg Leu Ala Gln Leu Ala
1               5                   10
```

<210> SEQ ID NO 128
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(19)
<223> OTHER INFORMATION: D-amino acid

<400> SEQUENCE: 128

```
Trp Trp Leu Leu Arg Gln Leu Ala Arg Leu Ala Gln Leu Ala Lys Leu
1               5                   10                  15

Thr Pro Val
```

<210> SEQ ID NO 129
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(20)
<223> OTHER INFORMATION: D-amino acid

<400> SEQUENCE: 129

```
Phe Arg Trp Leu Ala Arg Gln Leu Ala Arg Leu Ala Gln Leu Ala Lys
1               5                   10                  15

Leu Thr Pro Val
            20
```

<210> SEQ ID NO 130
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(20)
<223> OTHER INFORMATION: D-amino acid

<400> SEQUENCE: 130

```
Phe Arg Trp Leu Val Arg Gln Leu Ala Arg Leu Ala Gln Leu Ala Lys
1               5                   10                  15

Leu Thr Pro Val
            20
```

<210> SEQ ID NO 131
<211> LENGTH: 20
<212> TYPE: PRT
<213> ORGANISM: Artificial Sequence
<220> FEATURE:

```
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(20)
<223> OTHER INFORMATION: D-amino acid

<400> SEQUENCE: 131

Phe Trp Trp Leu Val Arg Gln Leu Ala Arg Leu Ala Gln Leu Ala Lys
1               5                   10                  15

Leu Thr Pro Val
            20

<210> SEQ ID NO 132
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(20)
<223> OTHER INFORMATION: D-amino acid

<400> SEQUENCE: 132

Phe Trp Trp Leu Ala Arg Gln Leu Ala Arg Leu Ala Ala Leu Ala Lys
1               5                   10                  15

Leu Thr Pro Val
            20

<210> SEQ ID NO 133
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: D-amino acid
<220> FEATURE:
<221> NAME/KEY: MOD_RES
<222> LOCATION: (3)..(20)
<223> OTHER INFORMATION: D-amino acid

<400> SEQUENCE: 133

Phe Trp Trp Leu Ala Arg Gln Leu Ala Ala Leu Ala Gln Leu Ala Lys
1               5                   10                  15

Leu Thr Pro Val
            20

<210> SEQ ID NO 134
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
```

```
<222> LOCATION: (1)..(25)
<223> OTHER INFORMATION: D-amino acid

<400> SEQUENCE: 134

Pro Ser Asp Gly Arg Gly Trp Trp Leu Ala Ala Gln Leu Ala Ala Leu
1               5                   10                  15

Ala Gln Leu Ala Lys Leu Thr Pro Val
            20                  25

<210> SEQ ID NO 135
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(25)
<223> OTHER INFORMATION: D-amino acid

<400> SEQUENCE: 135

Pro Ser Asp Gly Arg Gly Trp Trp Leu Ala Arg Gln Leu Ala Arg Leu
1               5                   10                  15

Ala Gln Leu Ala Lys Leu Thr Pro Val
            20                  25

<210> SEQ ID NO 136
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(25)
<223> OTHER INFORMATION: D-amino acid

<400> SEQUENCE: 136

Pro Ser Asp Gly Arg Gly Trp Trp Leu Val Arg Gln Leu Ala Arg Leu
1               5                   10                  15

Ala Gln Leu Ala Lys Leu Thr Pro Val
            20                  25

<210> SEQ ID NO 137
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(25)
<223> OTHER INFORMATION: D-amino acid
<220> FEATURE:
<221> NAME/KEY: MOD_RES
<222> LOCATION: (11)..(11)
<223> OTHER INFORMATION: Orn
<220> FEATURE:
<221> NAME/KEY: MOD_RES
<222> LOCATION: (15)..(15)
<223> OTHER INFORMATION: Orn
<220> FEATURE:
<221> NAME/KEY: MOD_RES
<222> LOCATION: (21)..(21)
<223> OTHER INFORMATION: Orn

<400> SEQUENCE: 137
```

```
Pro Ser Asp Gly Arg Gly Trp Trp Leu Ala Xaa Gln Leu Ala Xaa Leu
1               5                   10                  15

Ala Gln Leu Ala Xaa Leu Thr Pro Val
                20                  25
```

<210> SEQ ID NO 138
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(17)
<223> OTHER INFORMATION: D-amino acid

<400> SEQUENCE: 138

```
Leu Val Arg Gln Leu Ala Arg Leu Ala Gln Leu Ala Lys Leu Thr Pro
1               5                   10                  15

Val
```

<210> SEQ ID NO 139
<211> LENGTH: 25
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(6)
<223> OTHER INFORMATION: D-amino acid
<220> FEATURE:
<221> NAME/KEY: MOD_RES
<222> LOCATION: (8)..(25)
<223> OTHER INFORMATION: D-amino acid

<400> SEQUENCE: 139

```
Pro Ser Asp Gly Arg Gly Trp Trp Leu Val Arg Gln Leu Ala Arg Leu
1               5                   10                  15

Ala Gln Leu Ala Lys Leu Thr Pro Val
                20                  25
```

<210> SEQ ID NO 140
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(14)
<223> OTHER INFORMATION: D-amino acid
<220> FEATURE:
<221> NAME/KEY: MOD_RES
<222> LOCATION: (5)..(5)
<223> OTHER INFORMATION: Orn
<220> FEATURE:
<221> NAME/KEY: MOD_RES
<222> LOCATION: (9)..(9)
<223> OTHER INFORMATION: Orn

<400> SEQUENCE: 140

```
Trp Trp Leu Ala Xaa Gln Leu Ala Xaa Leu Ala Gln Leu Ala
1               5                   10
```

```
<210> SEQ ID NO 141
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(14)
<223> OTHER INFORMATION: D-amino acid

<400> SEQUENCE: 141

Trp Trp Leu Val Arg Gln Leu Ala Arg Leu Ala Gln Leu Ala
1               5                   10

<210> SEQ ID NO 142
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(13)
<223> OTHER INFORMATION: D-amino acid
<220> FEATURE:
<221> NAME/KEY: MOD_RES
<222> LOCATION: (1)..(1)
<223> OTHER INFORMATION: Phe, Leu or Trp
<220> FEATURE:
<221> NAME/KEY: MOD_RES
<222> LOCATION: (3)..(3)
<223> OTHER INFORMATION: Ala, Glu, Leu, Met or Val
<220> FEATURE:
<221> NAME/KEY: MOD_RES
<222> LOCATION: (4)..(4)
<223> OTHER INFORMATION: Ala, Lys, Arg or Orn
<220> FEATURE:
<221> NAME/KEY: MOD_RES
<222> LOCATION: (7)..(7)
<223> OTHER INFORMATION: Ala, Asp or Glu
<220> FEATURE:
<221> NAME/KEY: MOD_RES
<222> LOCATION: (8)..(8)
<223> OTHER INFORMATION: Ala, Lys, Arg or Orn
<220> FEATURE:
<221> NAME/KEY: MOD_RES
<222> LOCATION: (10)..(10)
<223> OTHER INFORMATION: Ala, Lys, Gln, Arg or Thr
<220> FEATURE:
<221> NAME/KEY: MOD_RES
<222> LOCATION: (11)..(11)
<223> OTHER INFORMATION: Ala, Lys, Gln or Arg

<400> SEQUENCE: 142

Xaa Leu Xaa Xaa Gln Leu Xaa Xaa Leu Xaa Xaa Leu Ala
1               5                   10

<210> SEQ ID NO 143
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (1)..(1)
<223> OTHER INFORMATION: Orn
<220> FEATURE:
<221> NAME/KEY: MOD_RES
<222> LOCATION: (1)..(5)
<223> OTHER INFORMATION: D-amino acid
```

```
<400> SEQUENCE: 143

Xaa Leu Thr Pro Val
1               5

<210> SEQ ID NO 144
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MISC_FEATURE
<222> LOCATION: (1)..(12)
<223> OTHER INFORMATION: This sequence may encompass 7-12 residues

<400> SEQUENCE: 144

Arg Arg Arg Arg Arg Arg Arg Arg Arg Arg Arg Arg
1               5                   10
```